(12) United States Patent
Anandan et al.

(10) Patent No.: US 9,146,419 B1
(45) Date of Patent: Sep. 29, 2015

(54) QUANTUM ROD BASED COLOR PIXEL BACKLIGHT FOR LCD

(71) Applicants: Munisamy Anandan, Austin, TX (US); Aris Silzars, Sammamish, WA (US)

(72) Inventors: Munisamy Anandan, Austin, TX (US); Aris Silzars, Sammamish, WA (US)

(*) Notice: Subject to any disclaimer, the term of this patent is extended or adjusted under 35 U.S.C. 154(b) by 0 days.

(21) Appl. No.: 14/664,902

(22) Filed: Mar. 22, 2015

Related U.S. Application Data

(60) Provisional application No. 62/016,199, filed on Jun. 24, 2014.

(51) Int. Cl.
*G02F 1/1335* (2006.01)
*F21V 8/00* (2006.01)

(52) U.S. Cl.
CPC ........ *G02F 1/133617* (2013.01); *G02B 6/0035* (2013.01); *G02B 6/0073* (2013.01); *G02F 1/133609* (2013.01); *G02F 2001/133614* (2013.01)

(58) Field of Classification Search
None
See application file for complete search history.

(56) References Cited

U.S. PATENT DOCUMENTS

| | | | |
|---|---|---|---|
| 6,864,626 B1* | 3/2005 | Weiss et al. | 313/503 |
| 7,056,471 B1* | 6/2006 | Han et al. | 420/523 |
| 7,576,478 B2* | 8/2009 | Hikmet | 313/110 |
| 8,593,586 B2* | 11/2013 | Wang et al. | 349/61 |
| 2003/0066998 A1* | 4/2003 | Lee | 257/19 |
| 2005/0214967 A1* | 9/2005 | Scher et al. | 438/63 |
| 2010/0208172 A1* | 8/2010 | Jang et al. | 349/71 |
| 2011/0089809 A1* | 4/2011 | Noh | 313/483 |
| 2013/0341588 A1* | 12/2013 | Jeon et al. | 257/13 |

* cited by examiner

*Primary Examiner* — Britt D Hanley

(57) ABSTRACT

A quantum rod based color pixel backlight system for Liquid Crystal Display, not requiring color filters and traditional polarizer, comprising multiplicity of LEDs, emitting ultraviolet or near-ultraviolet or blue light, assembled at one edge of a ultraviolet or near-ultraviolet or blue light transmitting light guide, which has other three edges and bottom surface coated with ultraviolet/near-ultraviolet reflecting layer and its top surface roughened with ultraviolet and near-ultraviolet extracting pixel patterns that contain aligned layers of quantum rods that emit different colors of plane polarized light in red, blue and green region with sharp spectrum, to increase the color gamut and optical efficiency of LCD screen, upon excitation by ultraviolet or near-ultraviolet or blue light. The formed pixels contain reflective islands or continuous reflective surface, underneath the layers of aligned quantum rods, to reflect the visible rays, generated by the pixelated quantum rods, towards the LCD and suppress the visible light leaving the pixel in other directions as well as suppress the visible light from adjacent pixels entering the pixel. Thus suppressing the inter-pixel color mixing that could occur without the incorporation of reflective islands or continuous reflective layer. LCD not requiring color filters and traditional polarizer, a micro-lens sheet and the light guide with color pixels are placed in substantial alignment to provide a color pixel backlight system for LCD. Thus plane polarized red, blue and green pixels of light from the light guide passes through the intended red, blue and green pixels of the color LCD, not requiring color filters and traditional polarizer, resulting in color pixel backlighting that enhances the optical efficiency of LCD as well as the color gamut on LCD screen.

13 Claims, 24 Drawing Sheets

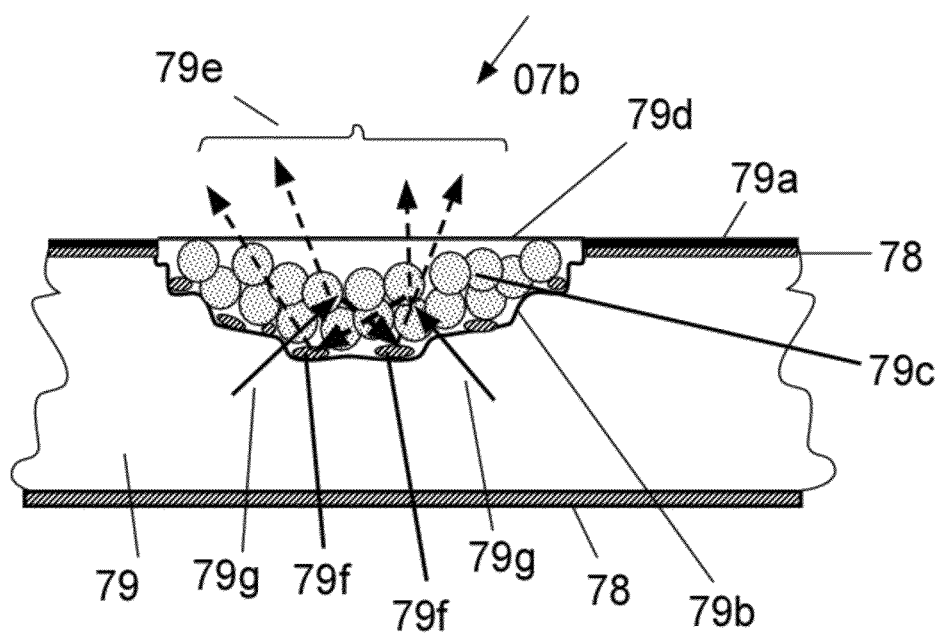
"Fig". 07B

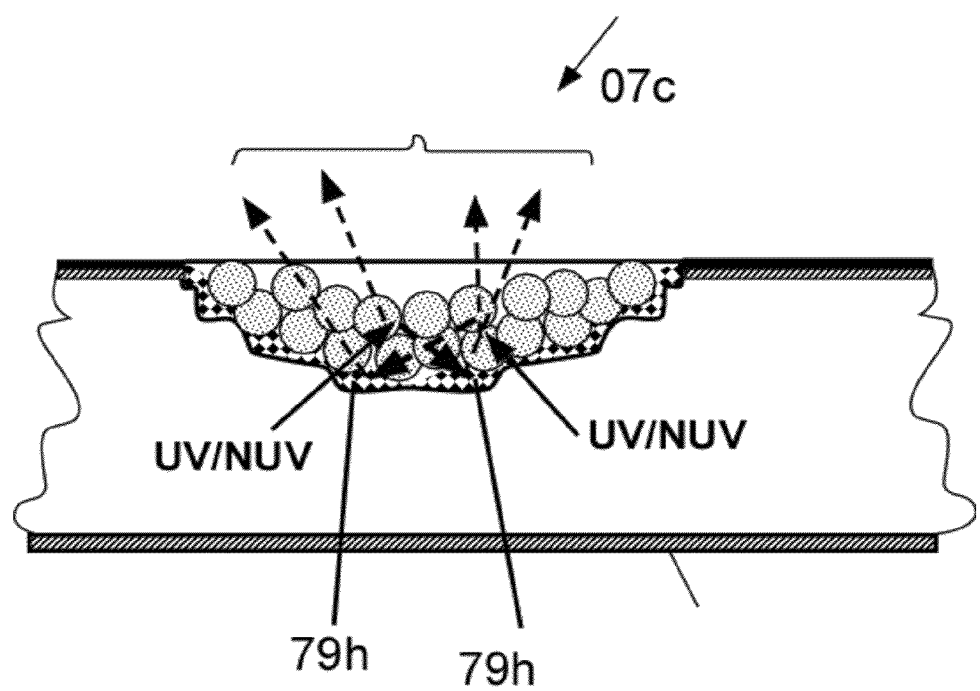
"Fig". 07C

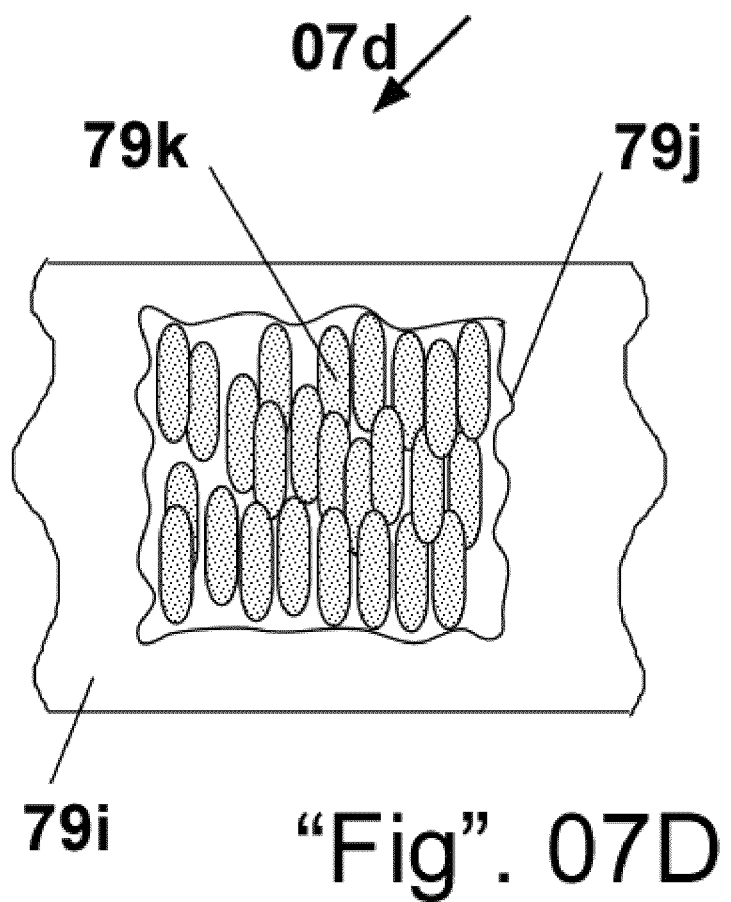
"Fig". 07D

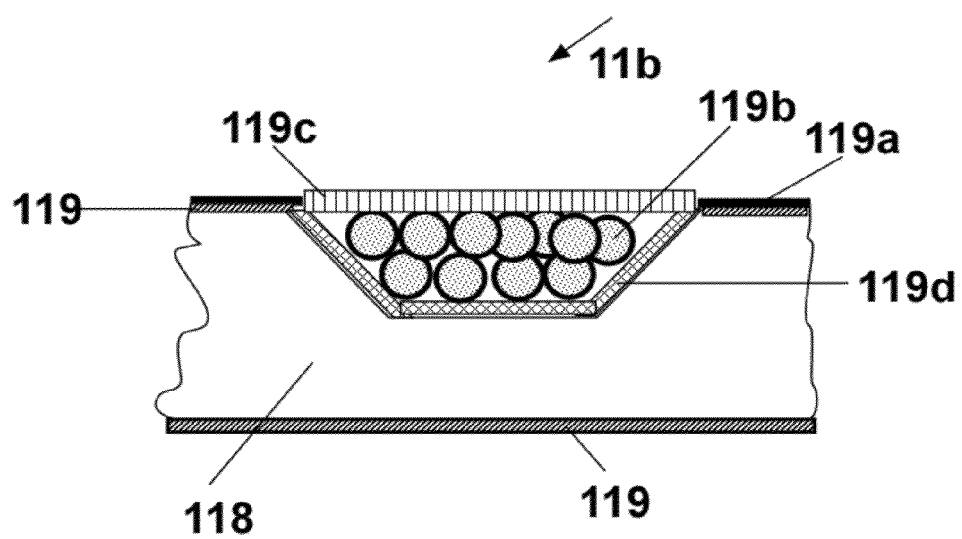
"Fig". 11B

QUANTUM ROD BASED COLOR PIXEL BACKLIGHT FOR LCD

CROSS REFERENCE TO RELATED APPLICATION

1. U.S. Pat. No. 8,459,855B2—Anandan et. al, Jun. 11, 2013
2. U.S. Pat. No. 8,902,384 US20130341588 A1—II Jeon et. al, 2014

OTHER PUBLICATIONS

1. S. M. P. Bolm et. al—"Towards polarized light emitting backlights: Micro-structured anisotropic layers" Asia Display/IDW'01 Proceedings, pp. 525-528, 2001, Nagoya, Japan
2. Shin-Tson Wu—"Energy efficient TFT-LCDs", p. 20 on wire grid polarizer, Seminar Lecture Notes, Society for Information Display, Jun. 1, 2009
3. Physicsworld.com (IOP), Feb. 7, 2014—"Pyramid powers polarizing light source using quantum rods".
4. Ramunas Nedzinskas et. al—"Polarized photoreflectance and photoluminescence Polarized photoreflectance and photoluminescence spectroscopy of InGaAs/GaAs quantum rods grown with As2 and As4 sources, Nanoscale research letters, Nanoexpressm, 2012, Springer Publication.
5. Chunxing She et. al—"Colloidal Colloidal Quantum Rods and Wells for Lighting and Lasing Applications", SID Digest of Technical Papers, pp. 134-137, 2014.
6. Ying Zheng et. al—"High efficiency and long lifetime quantum rod light emitting diodes for flat panel display applications", Digest of Technical papers, pp. 221-223, 2013.
7. M. J. J. Jack et. al—"Color Separating backlight for improved LCD efficiency", pp. 175-178, Proceedings of $27^{th}$ International Display Research Conference, 18-20 Sep. 2007, Moscow, Russia.
8. Mosier et. al—"LCD backlight with ULTRAVIOLET light emitting diode and planar reactive element", U.S. Pat. No. 7,036,946
9. Munisamy Anandan et. al—"Thick film integrated flat fluorescent lamp", U.S. Pat. No. 4,978,888.
10. Gerardus Van Gorkum—US Patent Application US 2003/0141800 A1
11. Munisamy Anandan—"ULTRAVIOLET based color pixel backlight for Liquid Crystal Display"—U.S. Pat. No. 7,934,862
12. Tae-Ho Kim1—"Light-emitting diodes and full-color displays using transfer-printed assemblies of colloidal quantum dots, IMID 2014
13. Young Joo Na, Sang Joon Park, Sang Wha Lee, Jong Sung Kim-"Photolithographic process for the patterning of quantum dots", Ultramicroscopy, 108 (2008) 1297-1301

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of Invention

This invention belongs to the area of flat panel display and more specifically to the backlight technology for Liquid Crystal Display (LCD).

LCD does not emit light and hence requires a backlight for its function as a visual display. Backlights based on Cold Cathode Fluorescent lamps (CCFLs) have been employed for backlighting LCDs. Recently Light Emitting Diodes (LEDs) have been employed as light sources for backlighting LCDs. White LEDs are predominantly used in cell phones, digital cameras, iPads, lap top computers and LCD TV for backlighting LCDs. Red, Blue and Green LEDs are used also used in backlighting LCD TV. LCD requires a flat or sheet source of light at its rear side. As LEDs are point sources of light, there is a need to convert the point source of light into a sheet source of light. This conversion is done through two configurations namely, edge-lit configuration and direct-lit configuration. In an edge-lit configuration, the LEDs are assembled at the edges of a rectangular light guide, usually a polycarbonate slab, and the light from LEDs undergo total internal reflections at the inner surface of light guide and finally get extracted through top surface of light guide facing the back surface of LCD. In the direct-lit configuration, LEDs are assembled inside a box and a diffuser sheet is assembled over the LEDs. Light from LEDs get mixed inside the box and further mixed in the diffuser sheet and finally emanates from the diffuser sheet towards LCD.

Thus a sheet source of light, usually white light, is generated and provided as backlight for LCD. The white light from LEDs contains all three primary colors and the colors are further filtered by color filters incorporated inside LCD for generating good quality of color pictures. It is well known that the color filters absorb 70-80% of incoming light and hence the LCD becomes optically less efficient. This still remains a challenge for the LCD industry. There is one more challenge that the LCD industry is facing and that is related to the polarizer employed for the functioning of LCD. A polarized light is necessary for the functioning of LCDs employed in major applications namely, TV, Cell phone, Desk top computer, lap-top computer, tablet computer and monitors. For polarizing the light a polarizer is laminated to the rear substrate of LCD facing the backlight and the light from the backlight is thus polarized by the polarizer before the light enters the liquid crystal layers. There is an analyzer (also possess polarizing property) laminated to the front substrate of LCD and this analyzer does not impose light loss. In all the descriptions that follow, the polarizer is the main focus and not the analyzer. The polarizer absorbs 50% of the light incident on it. Finally only 5-6% of the light sent by backlight to LCD emerges for the viewer to see the pictures or any information on LCD screen and in this manner LCD is lacking optical efficiency.

2. Description of Prior Art

No single prior art, to the best of knowledge of the current inventors, deals with the solution for optical inefficiency of LCD caused by both the polarizer and color filters, simultaneously. There are prior arts that deal with the elimination of color filters alone inside LCD. For example in one prior art (U.S. Pat. No. 4,978,888), Anandan et. al describes the use of flat fluorescent lamp incorporating red, blue and green color phosphors in the form of pixels, for backlighting color filterless LCD. Red, blue and green color light from the pixilated surface of the flat fluorescent lamp provides individual primary colors of light to the pixels of LCD that does not incorporate color filters. Hence the use of the term 'color pixel backlighting'. The drawback in this prior art is the high ignition voltage in the range of thousands of volts and running voltage in the range of hundreds of volts, in addition to thick and massive glass plates employed for the flat light source.

In another prior art (M. J. J. Jack et. al—"Color Separating backlight for improved LCD efficiency", pp. 175-178, Proceedings of 27th International Display Research Conference, 18-20 Sep. 2007, Moscow, Russia; Yoichi Taira et. al, "Low power LCD using a novel optical system", *SID-02 Digest*, pp. 1313-1315, 2002; Jyrki Kimmel et. al, "Diffractive backlight grating array for mobile displays", Proceedings of IDRC 2007, pp. 171-174, Moscow, September 2007) the authors describe the use of diffraction grating over the light guide to separate the three primary colors from the white light and employ a sheet of micro-lenses. The diffraction grating-separated three primary colors go through the LCD that has no color filters. The drawback in this prior art is the 'color crosstalk'. That is, light of one color passes through the unintended pixel of LCD where a different colored light is incident. It is clear from the prior art that providing a simple solution for 'color pixel backlighting' for LCD, not requiring color filters, is a challenge.

In yet another prior art (U.S. Pat. No. 7,036,946 B1) Donald E. Mosier describes LCD backlight employing ultraviolet LEDs. In this invention, ultraviolet light from LEDs is coupled to a light guide and the ultraviolet light is made to fall on phosphor coated on the surface of light guide to emit visible light towards the LCD. This invention is completely devoid of the concept of 'color pixel backlighting' and does not deal with LCD not requiring color filters.

In a research paper (N. Ogawa et. al—"Filed sequential color, LCD using organic EL backlighting"—SID Digest of Technical Papers SID International Symposium 1999), N. Ogawa et. al describe organic based electroluminescent backlight that is backlighting an LCD without color filters. This art is based on the field sequential operation of LCD wherein each frame of LCD driving consists of only one color. For example the backlight will provide a sheet of red light to the LCD 60 times per second and the LCD will select red pixels during this period. The next will be green sheet of light from backlight for 60 times a second followed by blue sheet of light. In other words the backlight will provide continuous sheet of light with a frame rate of 60 Hz for each color. This takes place sequentially for each color during which time the desired color pixels will be selected on LCD to generate color images. In this art, there is no 'color pixel backlighting' that takes place continuously. This is totally a different mode of operation and the sequential flashing of color sheet of light on LCD results in Psycho-physical effect that makes display exhibit 'color break-up', a defect that is still to be solved by LCD industry to make any commercial product.

In the literature, employment of quantum rods for LCD backlight has been described. One such literature (Zhenyue et. al—"Emerging Quantum-Dots-Enhanced LCDs", IEEE Journal of Display Technology, Vol. 10, No. 7, July 2014) describes various configuration of backlight employing quantum rods but all the described configurations need color filters inside LCD.

Now turning to the polarizer of LCD, there have been several attempts to eliminate the polarizer laminated to LCD and thus increase the optical efficiency of LCD. One prior art reported in the literature (Shin-Tson Wu-"Energy efficient TFT-LCDs", p. 20 on wire grid polarizer, Seminar Lecture Notes, Society for Information Display, Jun. 1, 2009) is the use of wire-grid polarizer in place of polarizer laminated to LCD. This is still another additional component namely removing the polarizer sheet and adding wire-grid polarizer. There is also additional disadvantage and that is 30% of the light is wasted by way of unwanted polarization. Another method proposed (by S. M. P. Blom et. al—"Towards polarized light emitting backlights: "Micro-structured anisotropic layers" Asia Display/IDW'01 Proceedings, pp. 525-528, 2001, Nagoya, Japan) to eliminate polarizer of LCD is to incorporate an anisotropic layer of material as an integral part of backlight. In this method, the purity of polarization is absent and further three is light loss through scattering effects. Hence this method did not succeed.

In all the foregoing inventions it is clear that none of the methods could solve the problem of optical inefficiency present in LCD. There is one invention (U.S. Pat. No. 8,459,855B2) titled, "ultraviolet LED based color pixel backlight incorporating quantum dots for increasing color gamut of LCD" by Anandan et. al that has the correct design and configuration to eliminate color filters for LCD and hence the optical efficiency of LCD can be improved. But this art still requires polarizer for LCD. That is, this invention can solve one problem (color filter) but not both (color filter and polarizer). It is also clear from the foregoing inventions that there is not a single invention that can eliminate both the polarizer and color filters of LCD to enhance the optical efficiency of LCD.

BRIEF SUMMARY OF THE INVENTION

According to the present invention, a color pixel backlight, incorporating quantum rods, a planar light guide and ultraviolet LEDs or near-ultraviolet or Blue light emitting LEDs as light sources, is described. This unique and innovative backlight, employing quantum rods provides pixelated three primary colors of plane polarized lights for backlighting LCD that does not require color filters and polarizer. Both edge-lit and direct-lit light guides are described. The ultraviolet or near-ultraviolet or blue light is injected into the ultraviolet, Blue and near-ultraviolet light guide and the ultraviolet or near-ultraviolet or blue light undergoes total internal reflections inside the light guide. The ultraviolet or near-ultraviolet or blue light is extracted through extracting features etched on the surface of light guide that faces the LCD. The ultraviolet or near-ultraviolet or blue light extraction features are coated with a thin porous layer of Aluminum over which is coated a layer of red-light emitting quantum rods in a red pixel, blue-light emitting quantum rods in blue pixel and green-light emitting quantum rods in green pixel. When the extracted ultraviolet or near-ultraviolet or blue light falls on the quantum rods, corresponding colors of light is generated through photo-luminescence. The uniqueness of the quantum rods is the emission of plane polarized light, along its long axis, on excitation by ultraviolet or near-ultraviolet or blue light. In addition spectrum emitted by quantum rods is sharp and the wavelength of the emitted light is dependent on the size of the quantum rod and material of the quantum rod. The sharper the spectrum, the better is the color quality and hence better is the quality of color pictures on the LCD screen that obtains its plane polarized backlight from quantum rods. The etched features or pattern can be in the form of pixels or stripes. When the light guide is aligned to LCD with its etched features and a coupling micro-lens sheet in between, the pixels of LCD are backlit or illuminated with individual colored lights in the form of pixels. Plane polarized red light from etched pattern of the light guide will fall on the pixel of LCD that is intended to generate red pixels for the image. A similar phenomenon takes place for blue and green colors of light. Thus the color LCD, not requiring color filters, obtains its intended colored backlight in the form of color pixels of plane polarized light. As the quantum rods emit sharp spectrum compared to the traditional phosphors employed in fluorescent lamps, the color gamut of LCD, that is back-lit by the pixelated backlight of the present invention, is enhanced and thus results in superior quality of color images on LCD screen with additional advantage of increase in optical efficiency due to the absence of color filters inside LCD. Additionally, the plane polarized light emitted by quantum rods eliminates the polarizer, thus increasing the optical efficiency of LCD further.

It is an object of this invention to provide color pixel backlighting for LCD, that does not require color filters and polarizer, using planar light guide that accepts and converts ultraviolet or near-ultraviolet or blue light into plane polarized red, blue or green light, to enable the LCD to have high optical efficiency.

A further object of this invention is to provide visible color pixel backlighting, emitting plane polarized light, for LCD, that does not require color filters and polarizer, through a planar light guide whose edges are assembled with ultraviolet or near-ultraviolet or blue light LEDs that inject ultraviolet or near-ultraviolet or blue light into the light guide in the edge-lit configuration.

Yet another object of this invention is to provide color pixel backlighting, emitting plane polarized light, for LCD that does not require color filters and polarizer through a planar light guide in the form of a box which contains ultraviolet or near-ultraviolet or blue light emitting LEDs assembled in the direct-lit configuration.

Yet another object of this invention is to provide pixelated or striped visible color pixel backlighting, emitting plane polarized light, for LCD that does not require color filters and polarizer through a planar light guide having its light source from ultraviolet LED or near-ultraviolet LED or blue light emitting LEDs.

Yet another object of this invention is to provide pixelated or striped visible color pixel backlighting, emitting plane polarized light, for LCD that does not require color filters and polarizer through a planar light guide, having its light source from ultraviolet or near-ultraviolet or blue light emitting LEDs, to obtain high color gamut on LCD screen through the incorporation of quantum rods inside each pixel that is excited by the ultraviolet or near-ultraviolet or blue light radiation.

BRIEF DESCRIPTION OF DRAWINGS

FIG. 07b shows the cross-section of a pixel that is depicted in FIG. 07a.

FIG. 07c shows the cross-section of a pixel that is depicted in FIG. 07a with a continuous single or multi-layer dielectric replacing all Al islands in a pixel in FIG. 07b.

FIG. 07d shows top down view of the pixel depicted in FIG. 07a.

FIG. 11b shows the cross-sectional view of a stripe taken from FIG. 11a.

DETAILED DESCRIPTION OF DRAWINGS

Figure 1A:
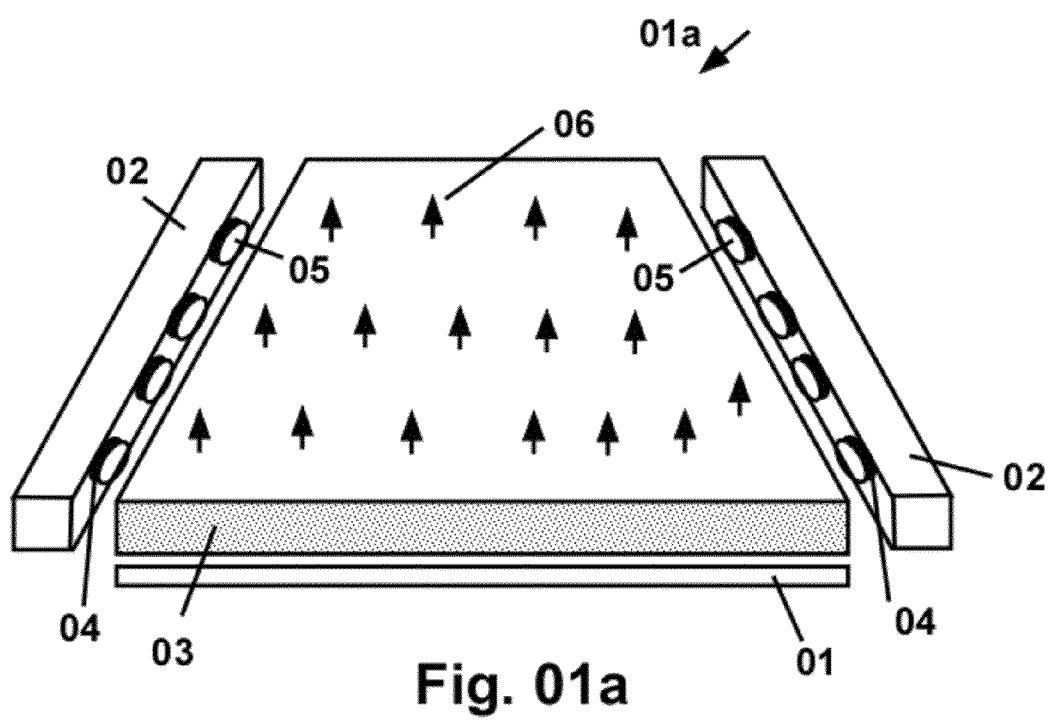
FIG. 01a is an isometric view of quantum dot based backlight for LCD according to one prior art.

FIG. 01a is an isometric view 01a of a backlight for LCD, according one prior art, employing quantum dots. The backlight consists of a reflector 01 at the back of the light guide 03 that receives light at its two edges from a reflector 02 that houses blue light emitting LEDs 04 having a coating 05 of quantum dots, details of which is not shown in FIG. 01a. The coating 05 contains two species of quantum dots that emit red and green light with sharp spectrum upon excitation by blue light from LEDs. The blue light from LED, the red light from one species of quantum dots and green light from another species of quantum dots combine to form a white light and this white light falls on the two edges of the light guide 03. The light guide 03 converts point source of white light from quantum dots in to a sheet source of light 06 through total internal reflections, not shown in FIG. 01a, and sends them upwards to LCD. This is a blanket backlight and not pixelated or polarized and hence the LCD will certainly need a polarizer and color filters. The only advantage of this prior art is the enhancement of color gamut of images on LCD screen by virtue of the sharp spectrum emitted by photo-luminescent quantum dots that receive blue light from LED.

Figure 1B:
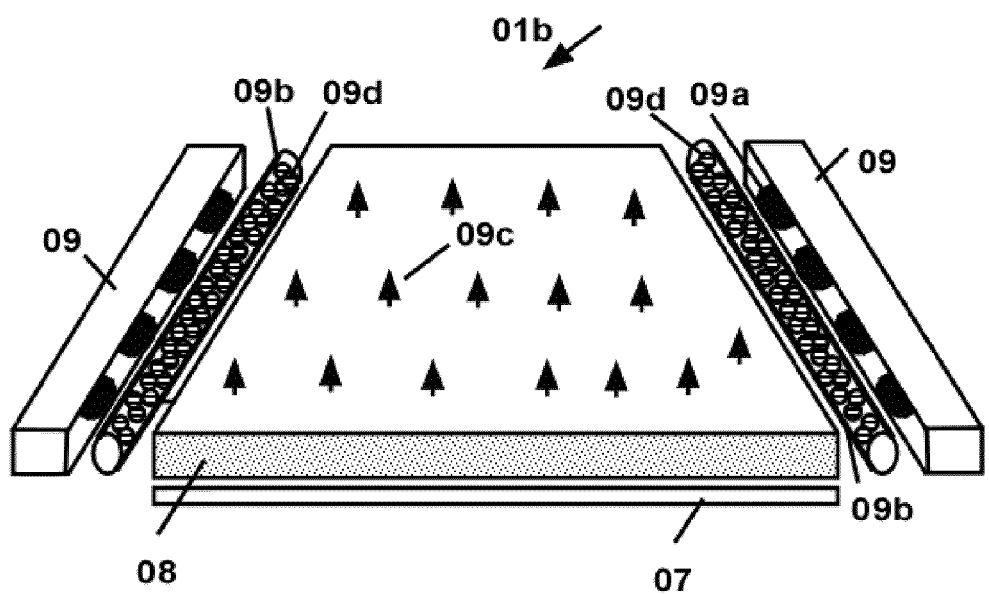
FIG. 01b is an isometric view of quantum dot based backlight for LCD according to another prior art.

FIG. 01b is another isometric view 01b of backlight according to another prior art that employs quantum dots. Reflector 07 serves to reflect light towards the light guide 08 that would otherwise travel downwards. The light guide 08 receives light to its two edges from a capsule 09b that contains quantum dots 09d. The quantum dots comprise two species, one emitting red light and another emitting green light upon excitation by blue light from LEDs. The blue light emitting LEDs 09a are housed in side a reflector housing 09 and the blue light emitted by blue LEDs 09a falls on the photo-luminescent quantum dots 09d through the transparent capsule 09b. The light guide 08 converts line source of light from the capsule 09b containing quantum dots 09d to a sheet source of light and sends the light towards LCD that is not shown in FIG. 01b. In this configuration of prior art, the stability of quantum dot is preserved by the capsule but all other characteristics are the same as in the prior art depicted in FIG. 01a.

Figure 1C:
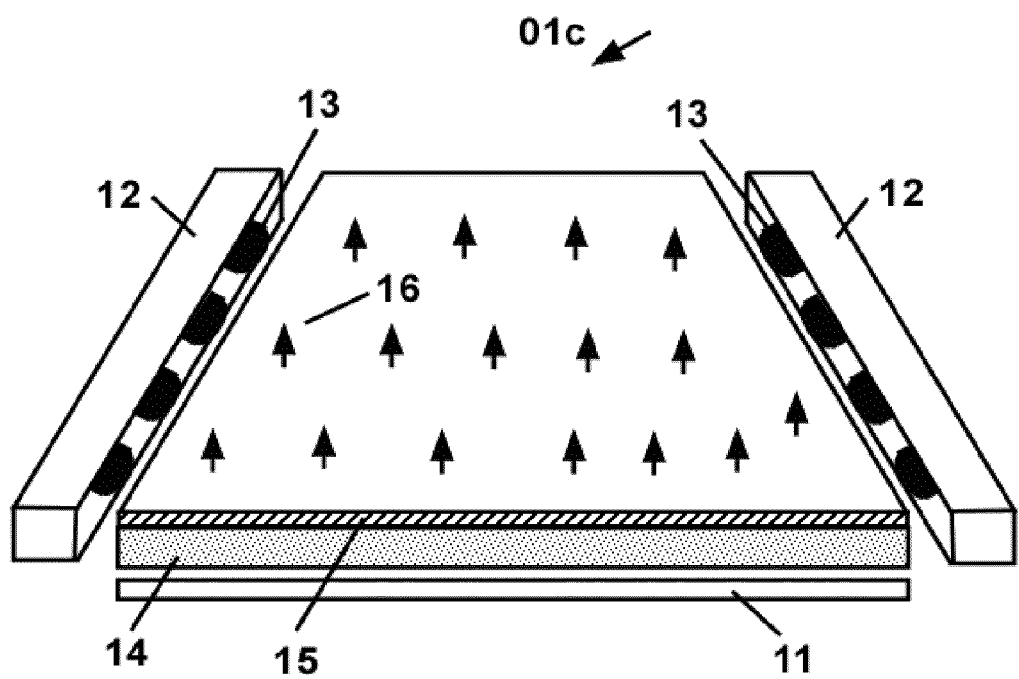
FIG. 01c an isometric view of quantum dot based backlight for LCD according to yet another prior art.

FIG. 01c shows an isometric view 01c of yet another prior art that comprises reflector 11, reflector housing 12, blue light emitting LEDs 13, light guide 14 and a sheet 15 containing quantum dots. In this configuration the sheet 15, containing photo-luminescent quantum dots, not shown in FIG. 01c, emit white light that contains sharp spectrum of red, blue and green light. The blue light from LEDs 13 is converted to sheet source of light by the light guide 14 and is incident on the sheet 15. There are two species of quantum dots embedded in the sheet for emitting red light and green light. On excitation by blue light coming from the light guide, the two species of quantum dots emit red and green light. The combination of red and green light from quantum dots and blue light from LEDs results in white light that contains sharp spectrum in red, blue and red region. The characteristics of backlight with this configuration is the same as that obtained from the configuration shown in FIG. 01a except that the insertion of a sheet containing quantum dot is convenient from assembly point of view by using blue light emitting LEDs without any coating on them.

Figure 1D:
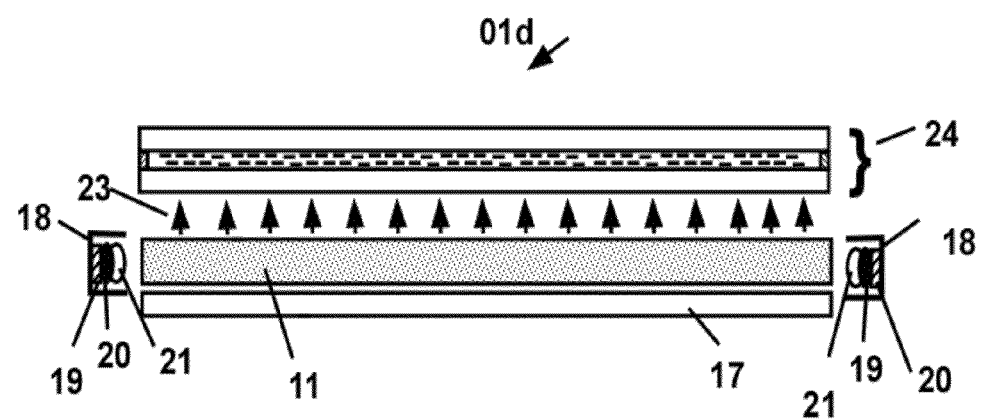
FIG. 01d is a cross-sectional view of the assembly of LCD and quantum dot based backlight shown in FIG. 01a FIG. 02 is an isometric view of the color pixel backlight, according to a prior art that incorporates ultraviolet or Near-ultraviolet or blue light emitting LEDs assembled at the edge of the light guide.

FIG. 01d shows the cross-sectional view 01d of the assembly of quantum dot based backlight with LCD. The light guide 11, with its bottom reflector 17, receives the light to its two edges from the housing 18 that contains LED mount 20, blue light emitting LED 19 and coating of quantum dot 21. The light guide 11 converts the white light which is a combination of blue light from LEDs, red light from quantum dots and green light from quantum dots, to white sheet of light 23 and send the white light upwards to the backside of LCD 24.

Figure 2:
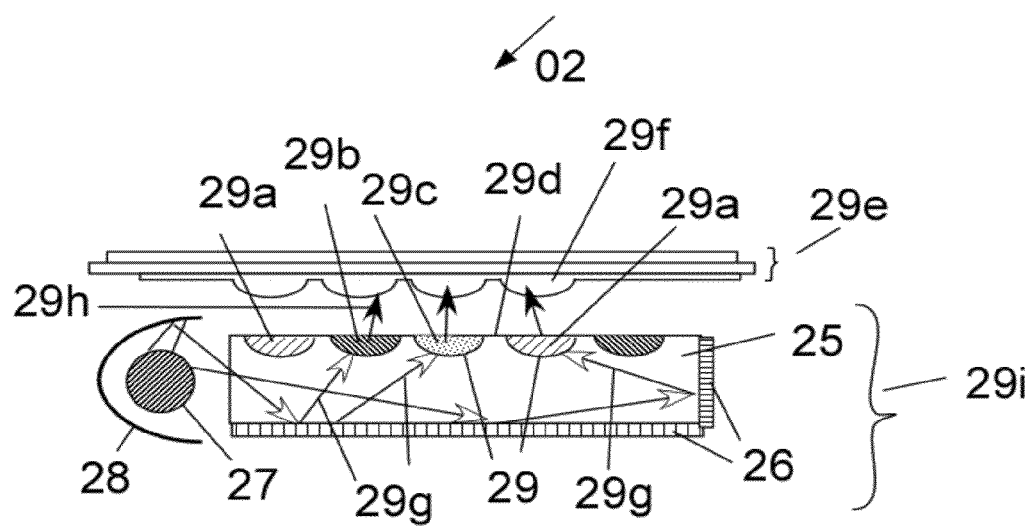

FIG. 02 shows the cross-sectional view 02 of the structure, according to another prior art, assembled in edge-lit mode behind an LCD with a micro-lens sheet in between. The rectangular light guide 25 has near-ultraviolet or ultraviolet or blue LEDs 27 at one edge with a reflector 28 that is partially covering the near-ultraviolet or ultraviolet or blue LEDs 27 except for the portion of near-ultraviolet or ultraviolet or blue LEDs facing the light guide 25. The light guide 25 has reflectors 26 coated on all edges of the rectangular light guide 25 except on the edge facing the near-ultraviolet or ultraviolet or blue LEDs 27. The reflector 26 is also coated on the broader surface at the bottom portion of the light guide. The light guide has roughened concave portions 29 in the form of pixels. For the sake of simplicity the roughened profile is not shown in FIG. 02. These roughened pixels 29 contain quantum dots (not shown in FIG. 02) that can emit different colors of visible light upon excitation by ultraviolet or near-ultraviolet or blue light rays. Depending on the color of emission of visible light by the quantum dots, the pixel is defined as the red pixel or blue pixel or green pixel. For example, 29a is the red pixel containing quantum dots that emit light of red color upon excitation by ultraviolet or near-ultraviolet or blue light rays, 29b is the blue pixel containing quantum dots that emit light of blue color upon excitation by ultraviolet or near-ultraviolet or blue light rays and 29c is green pixel containing quantum dots that emit light of green color upon excitation by ultraviolet or near-ultraviolet or blue light rays. The quantum dots are covered by a moisture protecting layer 29d. The near-ultraviolet or ultraviolet or blue light rays 29g, emerging after reflections at different surfaces of the light guide 25, are incident on different color pixels and thus excite the quantum dots contained in the pixels. As an example the excitation of quantum dots that emits light of blue color upon excitation by ultraviolet or near-ultraviolet or blue light rays results in blue light emission 29h from the blue pixel. Similarly red and green color light emissions are produced when the near-ultraviolet or ultraviolet or blue light rays are incident on the green and red pixels.

The whole light guide assembly 29i, the micro-lens sheet 29f, also called 'lenticular' sheet, and the LCD 29e are kept in alignment such that different colors of light emitted by the pixels are collimated by the micro-lens sheet 29f into the designated pixels of the LCD 29e. Light emitted by red pixel is collimated to the designated pixel of LCD that will display red pixel; light emitted by blue pixel is collimated to the designated pixel of LCD that will display blue pixel; light emitted by green pixel is collimated to the designated pixel of LCD that will display green pixel. Thus a color pixelated backlight is provided for the LCD that does not require color filters.

Figure 3A:
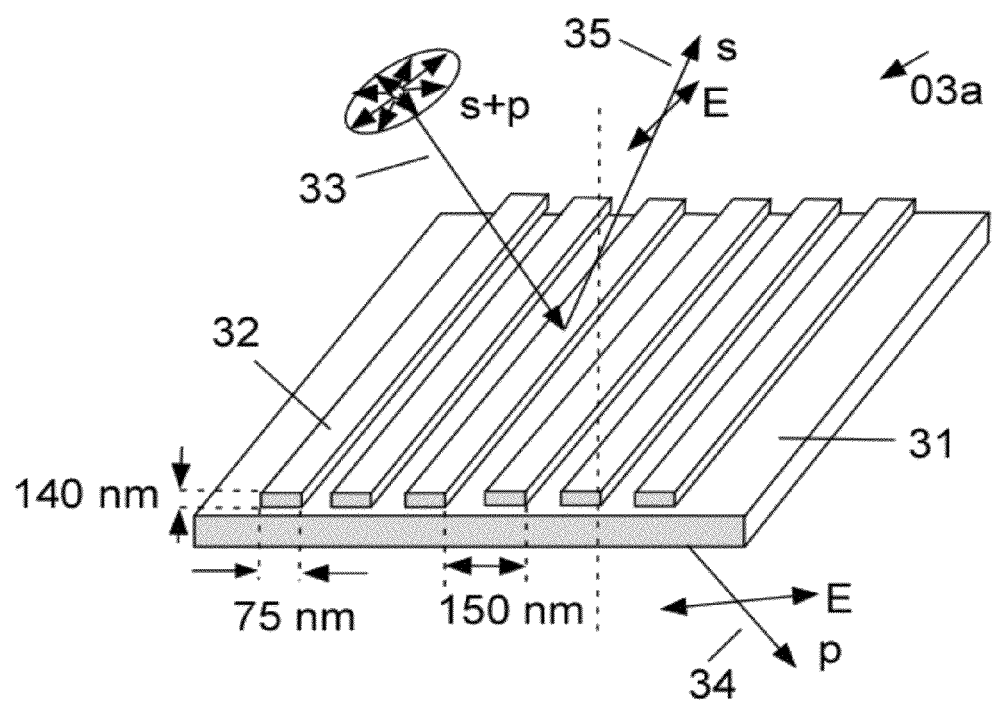
FIG. 03a is an isometric view of wire-grid polarizer according to one prior art.

FIG. 03a is an isometric view 03a of a wire-grid polarizer according to one prior art. The polarizer comprises a substrate 31 that contains thin film metallic bars 32 with pitch and dimensions less than the wavelength of light. Unpolarized light 33 with both p and s-polarization is incident on the metallic strip. Upon incidence, a transmitted light 34 emerges with p-polarization and a reflected light 35 emerges with s-polarization, as a result of electron motion, caused by the incident light inside the conducting strips.

Figure 3B:
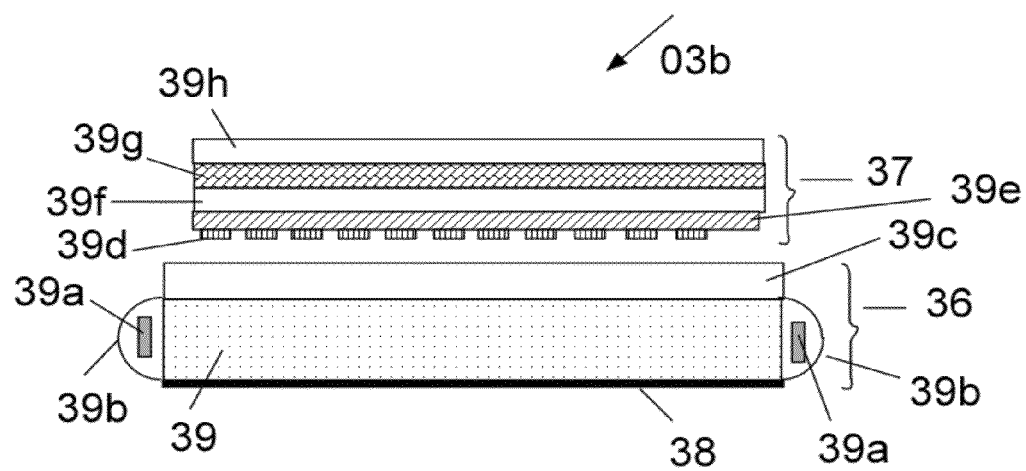
FIG. 03b is a cross-sectional view of the assembly of LCD (without traditional polarizer) with wire-grid polarizer.

FIG. 03b is the cross-sectional view 03b of the assembly of wire-grid polarizer to the LCD illuminated by edge-lit backlight. The backlight 36 comprises a light guide 39 to convert the point source of light from LEDs 39a in to flat source of light and has a reflector 38 and diffuser 39c to serve this purpose. A parabolic reflector 39b is placed around the LEDs 39a. The LCD 37 comprises two glass substrates 39f and 39h between which is sandwiched liquid crystal layer 39g. For polarizing the light received from backlight 36a wire grid polarizer is attached to the back glass plate 39f of LCD. The wire grid polarizer comprises a transparent substrate 39e and metallic nano-rods 39d. In this configuration, the reflected s-polarized rays from the wire grid polarizer are sent back to the backlight structure and some of them will be absorbed and some of them will be recycled back to the wire grid polarizer. These reflected s-polarized rays are not shown in FIG. 03b. The fabrication cost of wire grid polarizer is higher than the traditionally employed polarizer sheets in LCD manufacturing. Further, still there is substantial loss of light, about 30% in s-polarized light being not recycled completely. For these reasons, the LCD industry does not use wire grid polarizer in manufacturing.

Figure 4:
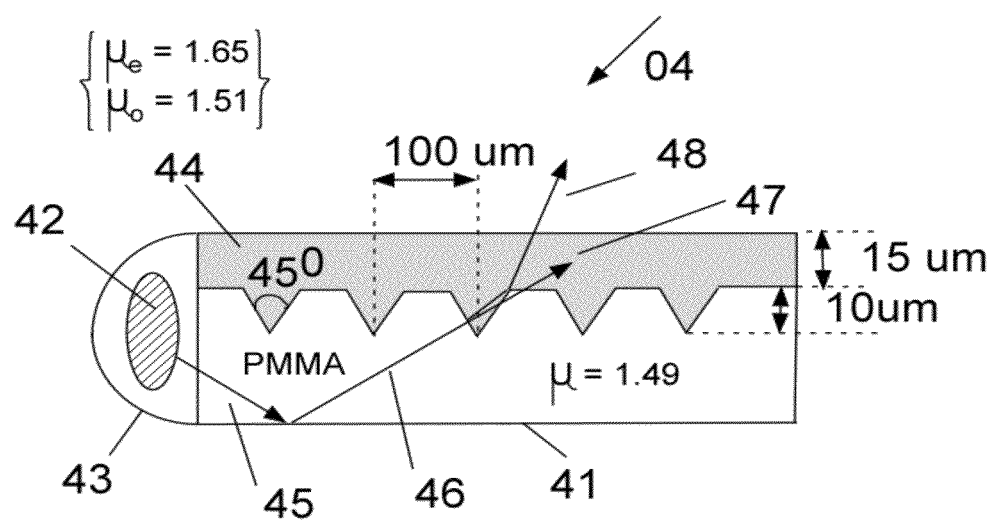
FIG. 04 is a cross-sectional view of a backlight integrated with an anisotropic layer to polarize the light from the backlight.

Use of anisotropic layer: Another method (by S. M. P. Blom et. al-"Towards polarized light emitting backlights: Micro-structured anisotropic layers" Asia Display/IDW'01 Proceedings, pp. 525-528, 2001, Nagoya, Japan) of obtaining linearly polarized light from the backlight is to employ anisotropic layer on top surface of backlight. A cross-sectional view illustrating this method is shown in FIG. 04. The light guide 04 that gives out linearly polarized light comprises the main body 41 made of plastic materials such as polycarbonate, Poly methyl Methacrylate (PMMA) has many microfeatures at its bottom surface, including a reflective layer, not shown in FIG. 04 for the sake of simplicity, to convert point source of light from LED 42, that is surrounded by a parabolic reflector 43 to direct the light towards the light guide, in to flat source of light. The main body of the light guide has grooves with 45° angle and filled with anisotropic material such as ultraviolet polymerized liquid crystal. The anisotropic layer 44 is a bi-refringent (double refraction) medium having ordinary refractive index of 1.51 and extraordinary refractive index of 1.65. PMMA material of the light guide has a refractive index of 1.49 close to the ordinary refractive index of anisotropic layer 44. An incident ray 45 from LED 42 is getting reflected at the bottom surface and off the light guide 41 and travels as reflected ray 46 towards the anisotropic layer 44. Since the anisotropic layer is bi-refringent, the ray 46 is split in to two rays 47 and 48. Ray 47 is p-polarized and ray 48 is s-polarized. Ray 47 will undergo reflection at the top surface of the anisotropic layer and enter the light guide structures and undergo multiple reflections and scattering, thus depolarized, come back to the anisotropic layer and undergo further splitting. In this way there will be some recycling of the ray 47. Ray 48 will travel towards the LCD as useful Plane-polarized light. In spite of recycling of rays 47, the s-polarized light still contains p-polarized component and hence unsuitable for use in LCD backlighting. For this reason and the reason of light loss due to scattering, this method is not employed in LCD industry.

From the foregoing it is clear that there is no one single method that exists for finding solution to both problems namely, (i) light loss through color filters in LCD and (ii) light loss through polarizer film in LCD.

Quantum dots have many shapes including rods. Quantum rods can be made of any of the following materials: InP; InAs; CdSe; InGaAs; InAsP; InSb; ZnO; InS; InGaN; Si; GaN; ZnS. There are many more materials that include cadmium and free from cadmium and the list is too long for listing here. Every rod is surrounded by a shell to prevent agglomeration of quantum rods and oxidation of the core material. In the conventional designation of rods, it is always written as CdSe/ZnS. This means the core material is CdSe and the shell material is ZnS. Some examples of the materials used for making quantum rods are: CdSe/CdS, CdSe/ZnS. ZnSe/ZnS, CdTe/CdS. There are other combinations of core and shell material that can be chosen from InP; InAs; CdSe; InGaAs; InAsP; InSb; ZnO; InS; InGaN; Si; GaN; ZnS. Sometimes the core of the quantum rods are doped with dopant materials like Manganese, Boron, Nitrogen and materials of rare-earth and typical semiconductor and traditional phosphor dopant materials. Doped quantum rods not only potentially retain almost all of the advantages in spectral sharpness and polarization but also avoid the self-quenching problem due to theft substantial ensemble Stokes shift. Two obvious advantages of doped quantum rods are (1) longer dopant emission lifetime and (2) potentially lower cytotoxicity. The dimensions of quantum rods are in nanometer range. For example, the length of the rod can be in the range of 15-50 nm and the diameter of the rod can be in the range of 5-10 nm. Upon photo-excitation by blue light or ultraviolet light or near-ultraviolet light, quantum rods emit visible light with sharp spectrum. The unique photo-luminescent characteristic of quantum rod is that it emits plane polarized light as opposed to quantum spherical dots that emit unpolarized light. The plane of polarization of emitted light from quantum rod is in a plane parallel to the long axis of the rod. Degree of polarization, as high as 84%, has been reported (IOP Physics world, February 2014). Quantum rods have many shapes and sizes. The rods are usually surrounded by a shell that preserves the stability of the rods. Single shell is usually employed but double shell is also reported. Double shell gives more protection and stability to the quantum rods.

Figure 5A:
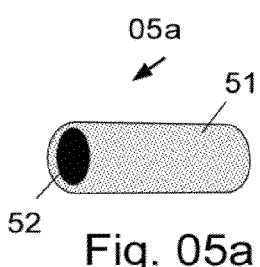
FIG. 05a is an isometric view of quantum rod with cylindrical shell.

FIG. 05a shows an isometric view 05a of a cylindrical quantum rod with its core 52 and shell 51. For example the core could be made of CdSe and shell CdS or the core could be ZnO and the shell of ZnS. There are many combinations of materials of core and shell depending on the spectrum emitted and the efficiency needed. FIG. 05a shows only one shell but the quantum rod can have two shells of different material surrounding it. The shape of the rod can be conical. In fact many shapes and geometries are possible. Only a few are illustrated in the Figures described here. The shell serves to shield the core from non-radiative losses due to charge trapping at the surface and preserves its photoluminescent property. Upon photo excitation either by blue light or ultraviolet light, plane polarized light, whose plane of polarization is along the long axis of the rod 51, is emitted.

Figure 5B:
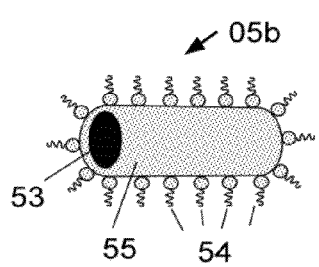
FIG. 05b is an isometric view of the same quantum rod with organic ligands attached.
Figure 5C:
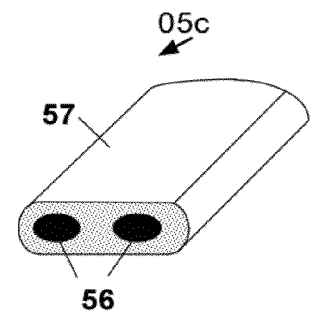
FIG. 05c is an isometric view of quantum rod with dual-core.
Figure 5D:
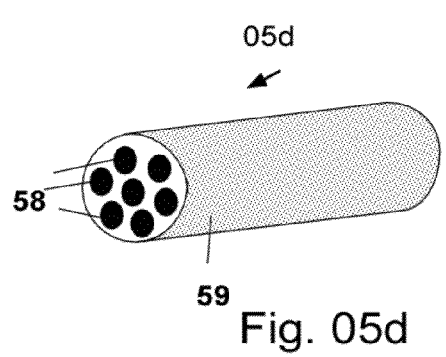
FIG. 05d is an isometric view of quantum rod with multi-core
Figure 5E:
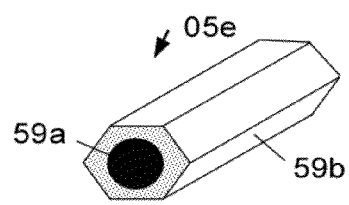
FIG. 05e is an isometric view of quantum rod with hexagonal shell with cylindrical core.
Figure 5F:
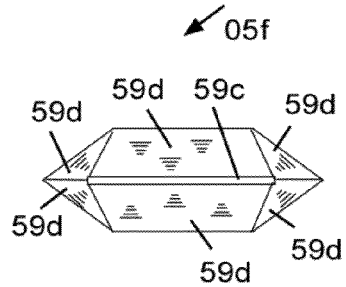
FIG. 05f is an isometric view of an elongated quantum rod with hexagonal structure.
Figure 5G:
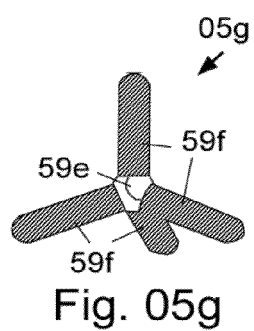
FIG. 05g is an isometric view of quantum rod called 'tetrapod'.

FIG. 05b shows cylindrical quantum rod 05b with its core 53, shell 55 and organic ligand 54. The organic ligand helps to mix the quantum rods to form liquid solution for printing the rods on substrates as well as stabilizing the surface. FIG. 05c shows 'twin-core' quantum rod 05c that is not reported so far but could possess interesting optical properties for employing in general lighting and backlighting. The twin-core 56 is surrounded by a common shell 57. In fact there could be even multi-core quantum rod 05d as depicted in FIG. 05d with multiple-core 58 and a common shield 59. FIG. 05e shows a hexagonal rod 05e with its core 59a and shell 59b. Multi-core is also possible in this hexagonal geometry. Another interesting structure of quantum rod is the 'elongated hexagonal' structure 05f shown in FIG. 05f. The figure shows the top view of the structure with its sides 59d of hexagon and elongation axis 59c. It is along this axis, the plane polarized light is emitted upon excitation by blue light or ultraviolet light. FIG. 05g shows a very interesting aspect 05g of the shape of quantum rod. This is called 'tetrapod' quantum rod. There are 'tripod' quantum rods and 'dipod' quantum rods and could lead to 'multi-pod' quantum rods in future. The tetra pod quantum rod is a special case of four rods 59f attached to the core 59e. For example, the core can be of the material CdSe and the four arms (length of 24 nm) can be of the material CdS. Tetrapod has interesting optical properties including emission of polarized light upon blue light excitation or ultraviolet/near-ultraviolet excitation and high degree of absorption of exciting spectrum. The arms play a big role in the light absorption.

The quantum efficiency of quantum rods is in the range of 75-85% and full width at half maximum (FWHM) of the emission spectrum is in the range of 25-35 nm. The tetrapod has the maximum absorption efficiency of the excitation spectrum close to 90%. The tetrapod-arms play the role of coupling the excitation energy to the core. In general the wavelength of the emission spectrum of quantum rods depends on the size of the core, the diameter of the rod and least on the length of the rod. The uniqueness of the emitted light from quantum rods is that the light is plane polarized. This is useful in eliminating the polarizer film of LCD that kills nearly 50% of the light from backlight. Quantum rods, both cylindrical and tetrapod structure are commercially available in colloidal form.

Figure 6A:
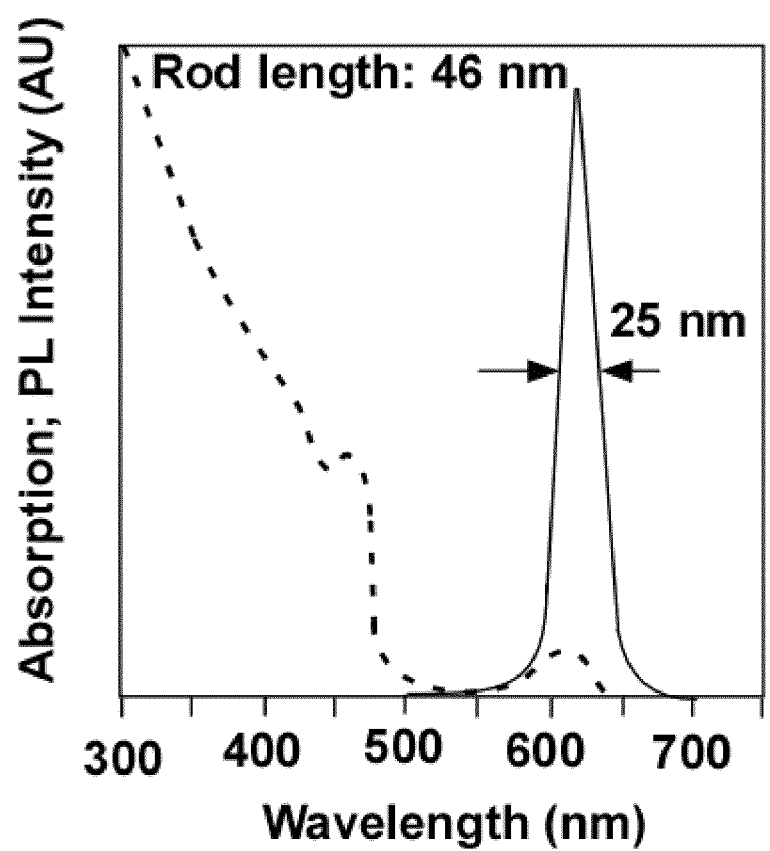
FIG. 06a shows the photo-luminescent spectrum emitted by quantum rod with CdSe as core and CdS as shell.
Figure 6B:
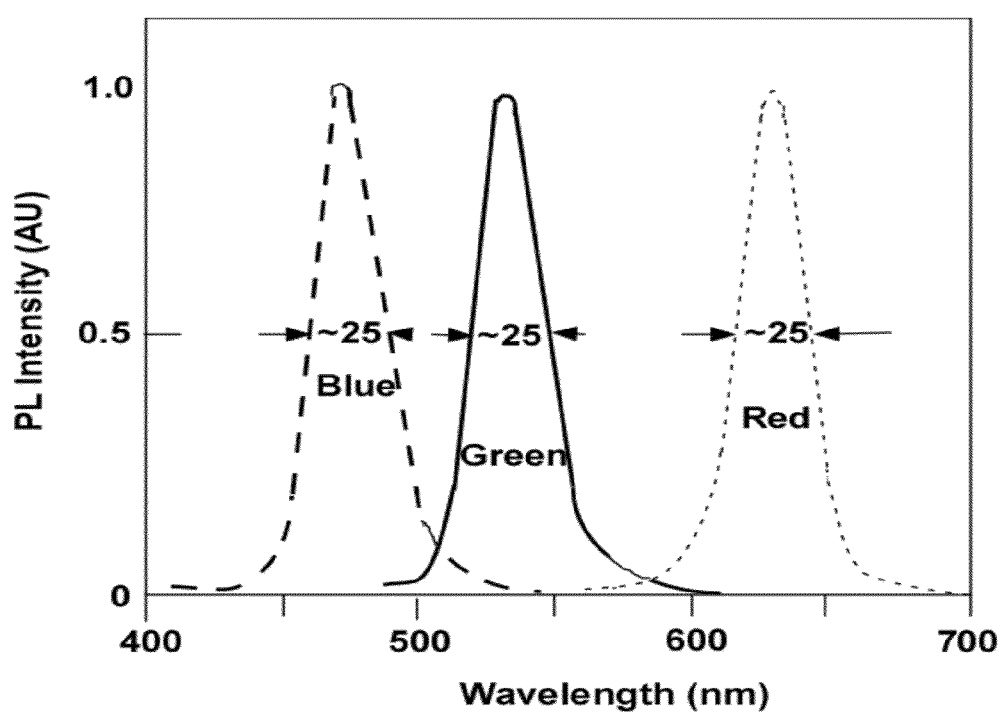
FIG. 06b shows the typical photo-luminescent spectrum emitted by quantum rods in three visible regions namely, red, blue and green.

The emission spectrum of quantum rod (Core: CdSe; shell: CdS) along with the excitation spectrum is given in FIG. 06a (Chunxing She et. al—"Colloidal Quantum Rods and Wells for Lighting and Lasing Applications", SID Digest of Technical Papers, pp. 134-137, June 2014). Dotted line shows the absorption spectrum and the solid line shows the emission spectrum. This illustration is for emission in red part of the visible spectrum. Similar emission spectrum can be obtained for green regions and yellow region and blue region of the spectrum. It can be seen that the absorption increases in the near-ultraviolet region. FIG. 06b shows the photo-luminescent spectrum of quantum dots (QDs) with CdSe as core and ZnS shell for green and red light emission (change in composition of Zn, S, Cd and Se for red and green) and ZnO as core with ZnS shell for blue light emission (Ying Zeng et. al—"High efficiency and long life time quantum-dot light emitting diodes for flat panel display applications, SID Digest of Technical papers, 2013. pp. 221-223). The average diameter of red and green light emitting quantum dots were 6-8 nm and the diameter of blue light emitting quantum dot was 10 nm. A similar spectrum can be normally obtained for quantum rods as well with additional special characteristics of plane polarized emission from quantum rods along their long axes. The spectrum shown in FIG. 06b depicts Full Width at Half Maximum (FWHM) of approximately 25 nm for red, green and blue light emission. Narrow spectrum (low values of FWHM) emitted by quantum dots or quantum rods is the main reason for enhanced color gamut on LCD TV screen if the quantum dots or rods are employed in the backlight for LCDs.

Figure 7A:
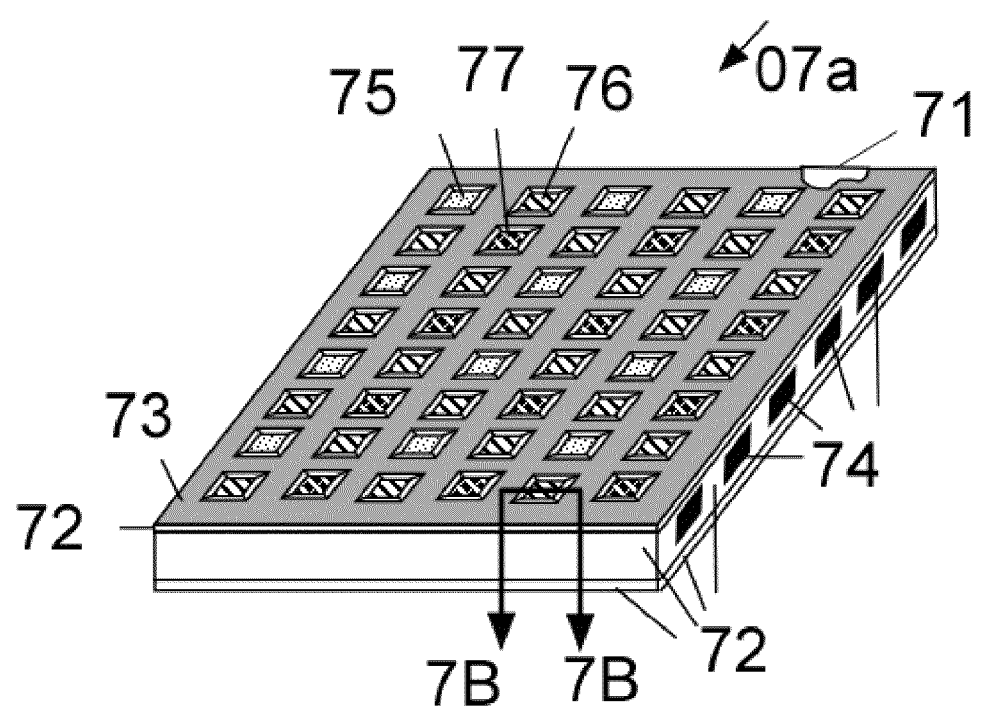
FIG. 07a shows the isometric view of quantum rod based color pixel backlight in edge-lit configuration.

FIG. 07a shows one embodiment of the present invention in the edge-lit configuration of pixelated backlight 07a. This novel pixelated backlight employs blue LEDs or near-ultraviolet LEDs or ultraviolet LEDs 74 as the source of light. The light guide 71 in this configuration is made of either borosilicate glass or quartz glass or Acrylic or plexiglass or any plastic material that has at least 90% transmission for ultraviolet and near-ultraviolet or visible radiation and does not degrade after prolonged exposure to ultraviolet/near-ultraviolet radiation. In all the descriptions that follow, wherever the light guide is described the light guide has this unique property. The rectangular light guide 71 has all its edges coated with ultraviolet and near-ultraviolet reflector 72 except for the area occupied by the LEDs 74. The reflector 72 is also a reflector of visible light. The LEDs 74 can be of the type, emitting ultraviolet light or the type emitting near-ultraviolet light or the type emitting blue light or a combination of ultraviolet and near-ultraviolet emitting LEDs. These are packaged LEDs with back reflector (not shown in FIG. 07a) inside the package to reflect the light in to the light guide 71. The LEDs described, in all descriptions that follow, have this feature of built-in reflectors inside the package. The built-in reflectors reflect visible light and ultraviolet/near-ultraviolet light. The LEDs are powered by external voltage applied to them but is not shown in FIG. 07a for simplicity. In the illustration, only one edge of the light guide is assembled with LEDs but they can be assembled on all four edges if need arises for increasing the light output. If only the near-ultraviolet or ultraviolet LEDs are employed, the packaging of near-ultraviolet or ultraviolet LEDs is such that no near-ultraviolet or ultraviolet comes out of flat package in direction other than the direction of injection in to the light guide. The bottom surface of the light guide is also coated with the ultraviolet/near-ultraviolet reflector 72 as shown. The ultraviolet/near-ultraviolet reflector can be made of Aluminum film which is also a reflector of visible rays. The top surface of the light guide is coated with the reflector 72 over all areas except the pixelated sites 75, 76 and 77. The site 75 is for red light emission, the site 77 is for blue light emission and the site 76 is for green light emission. This is called 'quad' pixel arrangement. The pixelated sites can have sizes of squares in the range of 25 microns to 150 microns. Besides square geometry there can be other geometries as well. Over the reflector 72 on the top surface of the light guide is coated with a black layer 73 that can be made of black resin containing black Titanium pigments or dry film black resist. The selective coating of reflector and black layer leaving the pixel sites uncoated can be done by at least one method. That is, a blanket layer of the reflector 72 is coated first on the flat top surface of the light guide, before the pixel sites are formed, followed by the blanket coating of black layer. Subsequent to the blanket coating, the pixel sites are formed through photo-lithographic etching or micro-sandblasting over the blanket coated surface. After the etching or sandblasting of the sites, a very thin film of Aluminum to a thickness of less than 5 nm is vacuum evaporated selectively at the pixel sites so that the Aluminum film is not continuous and instead it has substantial porosities with island formation. The film need not be conductive. (An alternative layer for substituting Al islands is the dielectric layer in the form of islands that transmit ultraviolet or near-ultraviolet light and reflect visible light. Because the dielectric layer is porous it will allow blue light from blue LEDs). After the super-thin Al film is formed, quantum rods, suspended in a liquid solution or mixed with ultraviolet epoxy, that emit red upon excitation by near-ultraviolet light or ultraviolet light or bluer light can be inkjet printed or sprayed through a mask or screen printed or spin-coated or stamped or dotted with micro-nozzle or electrophoretically deposited on the respective pixel sites. The spin coating, if preferred, is followed by photo-lithography, employing positive resist such as AZ1518 with developer such as AZ 351, for patterning. In the case of ultraviolet epoxy mixed quantum rods, drying is done by ultraviolet curing and in all other cases, thermal drying/baking is done. A similar process is followed for the quantum rods that emit green and blue light upon excitation by ultraviolet or near-ultraviolet rays. The deposition techniques incorporate the alignment of quantum rods so that all the rods emit plane polarized in the same plane along their long axes. There are many methods employed for the alignment of quantum rods including the exploitation of 'self-aligning' property of quantum rods in solvents and the method of thermally stretching the film of quantum rods. For the purpose of having increased surface area, the pixel sites are formed by etching or micro-sandblasting. Alternatively the sites can be left planar without etching or micro-sandblasting for the simplicity in manufacturing. The quantum rods and shells employed can be any combination of the materials from: InP; InAs; CdSe; InGaAs; InAsP; InSb; ZnO; InS; InGaN; Si; GaN; ZnS; CdS. Core and shell combination can be chosen depending on the color of light required. For example, CdSe as core and CdS as shell with a rod length of 46 nm can be chosen for red light emission, CdSe as core with ZnS as shell can be chosen for green light emission and ZnO as core and ZnS as shell can be chosen for blue light emission. The illustration in FIG. 07a shows individual color pixels with red-green-green-blue sub-pixel format. This can be any other format with different sequence. In all the descriptions that follow this condition is applicable for the pixel format.

An alternate material and method to the thin Aluminum deposition, described above, is the deposition of thin continuous single layer or multi-layer dielectric deposition through the method of sputtering. The dielectric film has the property of transmitting ultraviolet and near-ultraviolet but reflecting visible light. Thus it has the benefit of preventing the quantum-rod generated light escaping to the bottom of light guide and get absorbed as well as preventing visible light entering the adjacent pixel. With the dielectric layer as reflector, blue LEDs cannot be employed as light source because the dielectric layer will not transmit blue light to the quantum rods. However, if the dielectric layer is in the form of islands, like Al islands, then blue light emitting LEDs can also be employed. Islands of dielectric layer can be obtained by depositing the dielectric material through a shadow mask or through lithographic technique.

A detailed cross-sectional view 07b taken along 7B-7B in FIG. 07a is given in FIG. 07b. The light guide 79, made of either borosilicate glass or quartz glass or plexi glass or acrylic or any plastic material that has high near-ultraviolet transmission and not degraded by ultraviolet/near-ultraviolet rays, has a reflector 78, such as Aluminum, at the bottom surface which is broader and has other patterns, not shown in FIG. 07b, for extracting the light uniformly over the top surface of the light guide. The light guide has roughened surface 79b at the top in the form of a pixel that is concave. The roughening is done either through etching or micro-sandblasting and the roughened surface contains quantum rods 79c that emit a particular color of light and the layer of quantum rods has a protective layer 79d at the top to protect the quantum rods from the moisture and oxygen. The protective layer 79d is transparent and has no depolarizing effect of the plane polarized light that passes through it. In all the subsequent descriptions of the protective layer for quantum rods, this property is to be understood. The protective layer can be made of transparent thin (100 nm) film of inorganic oxides such as $TiO_2$, $SiO_2$, $ZrO_2$, $Al_2O_3$ deposited through Atomic Layer Epitaxy (ALE). Alternatively a transparent thin film of the shell material of quantum rod can also be employed through sputtering process or ALE process. The top surface has two layers one on top of the other namely, ultraviolet/near-ultraviolet reflective layer 78 and black layer 79a. The near-ultraviolet or ultraviolet or blue rays 79g, extracted from the light guide, are incident on the quantum rods 79c. (For sake of simplicity, the details of the core and shell of quantum rods are omitted in all the Figures that follow). This results in the excitation of quantum rods leading to the emission of plane polarized visible light rays 79e. The aluminum islands 79f obtained through very thin evaporation of Al, does the function of reflecting some of the visible rays going towards the bottom of the light guide as well as to the lateral direction of light guide. The Al islands also help in reducing the color cross-talk between pixels. An alternate material and method to perform the function of Al islands is described earlier under paragraph [0031]. When such alternate material and method is employed the cross-section of pixel 07c taken along 7B-7B in FIG. 07a is given in FIG. 07c.

In FIG. 07c all the parts labeled in FIG. 07b are the same except the dielectric layer 79h. This dielectric layer has the property of transmitting ultraviolet/near-ultraviolet rays but reflecting visible rays. This prevents visible rays going downward in to the bottom of the light guide or entering the adjacent pixel that generates different color of light. It should be recognized that blue light emitting LEDs cannot be employed as light source in this configuration because the dielectric layer will not transmit blue light to the quantum rods. The concave geometry of pixel sites in all the foregoing descriptions gives the benefit of increased surface area for high light output. However, for the sake of simplicity in manufacturing one can avoid forming concave geometry of pixel site (stated under paragraph 0030) and have a planar pixel site. Even in such cases, the Al island formation or dielectric layer formation is necessary to suppress the color cross-talk between pixels.

Figure 8:
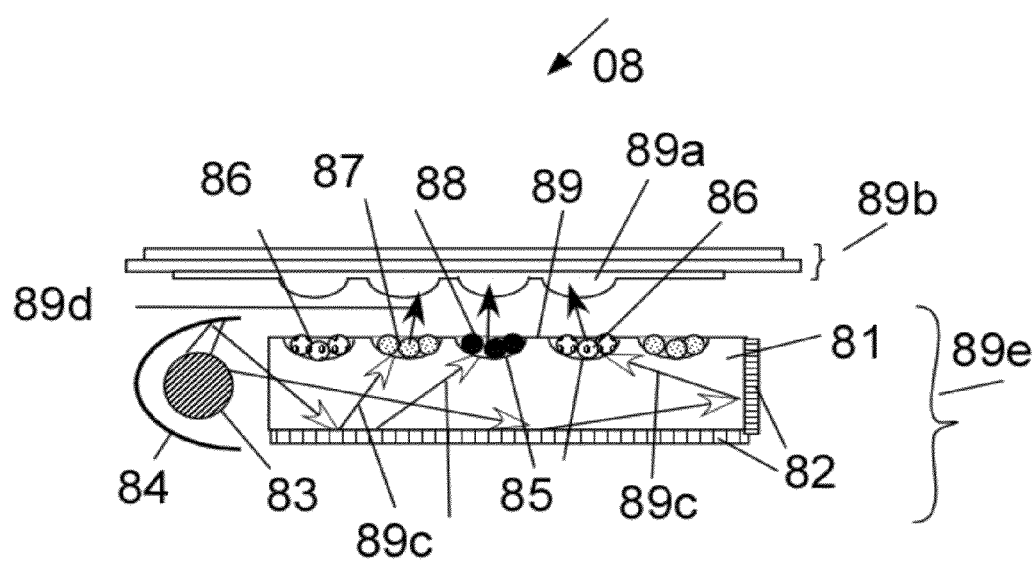
FIG. 08 shows the cross-sectional view of color pixel backlight, based on quantum rods, in edge-lit configuration along with the assembly of LCD over it.

A top-down view 07d of the pixel shown in FIG. 07c is illustrated in FIG. 07d. The light guide 79i is shown without the details of black layer, reflective layer and Al or multi-layer dielectric layer. The etched portion 79j contains the quantum rods 79k. It can be seen that the quantum rods are parallel to each other along the long axis. This is necessary for plane polarized light to emerge from each pixel. FIG. 08 shows cross-sectional view 08 of the assembly of color pixelated backlight, in edge lit configuration employing quantum rods, with LCD that does not require color filters and polarizer. In all the descriptions that follow wherever LCD is mentioned it is to be understood the LCD does not require color filters and polarizer, unless discretely mentioned, but still has analyzer. The analyzer is needed for the basic function of LCD and the analyzer does not affect or reduce the optical efficiency of LCD.

The assembly 08 comprises three major parts namely, pixelated backlight 89e, LCD 89b that does not require color filters and polarizer and micro-lens sheet 89a. The pixelated backlight has near-ultraviolet or ultraviolet or blue light emitting LED 83 at one edge with a reflector 84 that is partially covering the LED 83 except for the portion of LED facing the light guide 81. The LED is powered by externally applied voltage and is not shown in FIG. 08 for simplicity. The light guide 81, made of either borosilicate glass or quartz glass or Acrylic or plexiglass or any plastic material that has at least 90% transmission for ultraviolet and near-ultraviolet radiation and does not degrade after prolonged exposure to ultraviolet/near-ultraviolet radiation, has reflectors 82 coated on all edges of the rectangular light guide 81 except on the edge facing the LED 83 and the reflector 82 is also coated on the broader surface at the bottom portion of the light guide. The broader bottom side of the light guide 81 has other structural features, not shown in FIG. 08, to extract light uniformly. The light guide has roughened concave portions 85 in the form of pixels. For the sake of simplicity the roughened profile is not shown in FIG. 08. These roughened pixels 85 contain quantum rods that emit plane polarized red, blue or green colors of light, depending on the size of quantum rod and material of quantum rod, upon photo-excitation. Depending on the color of light emitted by the quantum rods, the pixel is defined as the red pixel or blue pixel or green pixel. For example, 86 is the red pixel containing quantum rods that emit red light, 87 is the blue pixel containing quantum rods that emit blue light and 88 is green pixel containing quantum rods that emit green light. The layers of quantum rods are covered by a moisture protecting layer 89. Reflective layer and black layer are not shown in FIG. 08. Also not shown in FIG. 08 are either Al islands or the alternative dielectric layer inside the pixel sites. To trace the light rays in this configuration, the near ultraviolet rays or ultraviolet rays or Blue light rays 89c, if near-ultraviolet or ultraviolet or blue light emitting LEDs are employed, are incident on the quantum rods contained in the pixel sites 86, 87 and 88. These rays 89c emerge after several reflections inside the light guide 81 and excite the quantum rods contained in the pixels. As an example the excitation of blue pixel by one such ray results in blue light emission 89d from the blue pixel. Similarly red and green color light emissions are produced when the rays 89*c* are incident on the green and red pixels. As described in the foregoing paragraphs, if the blue light emitting LEDs are used as the only light source, dielectric reflector that blocks visible light and transmit ultraviolet or near-ultraviolet cannot be employed inside the pixel site. Only porous Al layer or dielectric reflective islands are the choices. It should again be recognized that Al layer is highly porous. With Al or reflective dielectric islands, blue LEDs, or ultraviolet emitting LEDs or near-ultraviolet emitting LEDs or combination of these LEDs can be employed as light source for the backlight.

The whole light guide assembly 89*e*, the micro-lens sheet 89*a*, also called lenticular sheet, and the LCD 89*b* are kept in alignment such that different colors of light emitted by the pixels are collimated by the micro-lens sheet 89*a* in to the designated pixels of the LCD 89*b*. In the micro-lens sheet every lens will be facing every pixel in complete alignment. As given in the description, under quantum rods, plane polarized light emitted by red pixel is collimated to the designated pixel of LCD that will display red pixel. Plane polarized light emitted by blue pixel is collimated to the designated pixel of LCD that will display blue pixel. Plane polarized light emitted by green pixel is collimated to the designated pixel of LCD that will display green pixel. Thus a color pixelated backlight, incorporating quantum rods, is provided for the LCD that does not require both color filters and polarizer. In the illustration shown above, the pixel sites are concave in nature for increasing the surface area and thus light output. However for simplicity in manufacturing, if planar sites are desired the etching or roughening operation to obtain concave pixel site can be eliminated. It should be understood that an analyzer (crossed polarizer) on the viewing side of LCD is still necessary for the operation of LCD. This analyzer does not affect or decrease the optical efficiency of LCD. It is to be understood that the protective layer 89 is transparent and does not depolarize the light coming from the pixel sites.

Figure 8A:
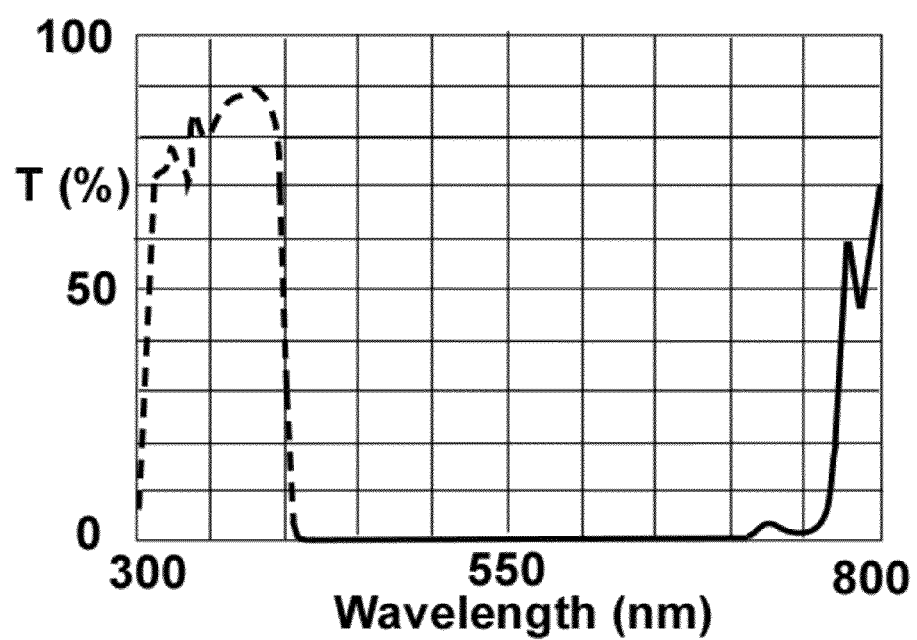
FIG. 08a shows the Near UV transmitting and visible wavelength blocking characteristics of a typical dielectric layer employed in band-pass filters is commercially available.

FIG. 08*a* shows the transmission characteristics of the dielectric layer that transmits UV/NUV rays but reflect visible rays. As mentioned in the foregoing paragraphs such dielectric layer can vastly suppress color cross-talk between the pixels. The dielectric materials exhibiting such transmission characteristics as shown in FIG. 08*a* are commercially available in band-pass filters. It can be seen that the transmission in the NUV region peaks to a maximum of 90% whereas in the visible region there is hardly any transmission.

Figure 9:
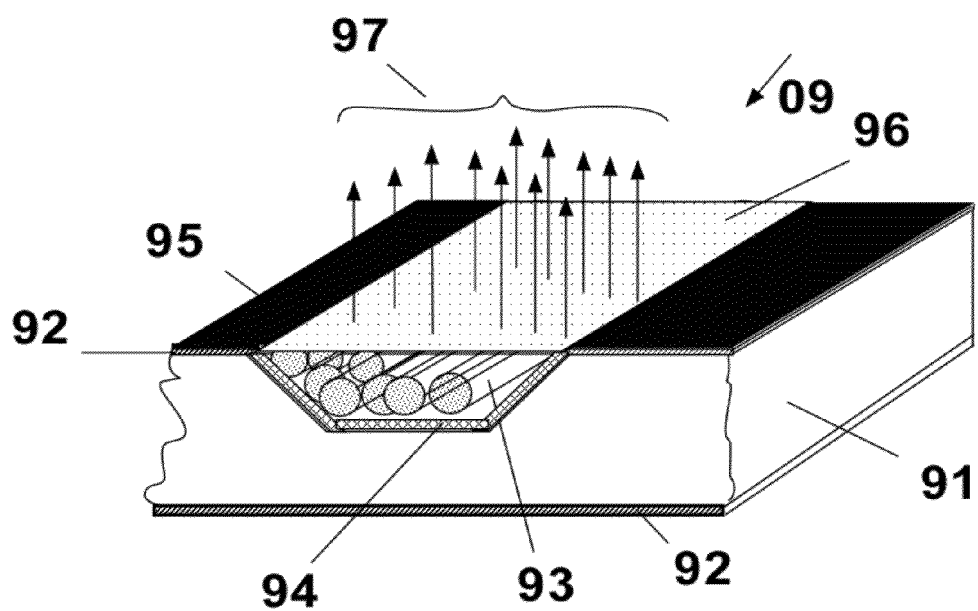
FIG. 09 shows isometric side-view of a pixel shown in FIG. 08.

FIG. 09 shows an isometric view 09 of another embodiment of pixel geometry with trough-like appearance containing quantum rods 93. The light guide 91 has the same description given in the foregoing paragraphs. Quantum rods 93, protective layer 96, dielectric layer 94, black layer 95, and reflective layer 92 also have the same description as given in the foregoing paragraphs. During the printing process of quantum rods or lithographic process of quantum rods, parallelism between rods as shown in FIG. 09 can be obtained. On photo-excitation, the rods emit plane polarized light 97. For illustration purpose, only one pixel is shown in FIG. 09. The same geometry of pixel is applicable for all red, blue and green pixels in a backlight. Multiplicity of red, blue and green pixels is processed for a complete backlight. The total number of pixels in the backlight is at least equal to the total number of pixels of LCD display that is illuminated by the backlight. The dielectric layer 94, comprising several layer of dielectric materials, has the property of transmitting ultraviolet and near-ultraviolet rays and reflecting visible rays and hence only ultra-violet emitting and near-ultraviolet emitting LEDs can be employed in this configuration. FIG. 08*a* illustrates the characteristics of such a multi-layer dielectric from the company Kupo Optics. The dotted line shows the transmission in near-ultraviolet range of 300 nm to 400 nm going from 80% to 90%.

Figure 10:
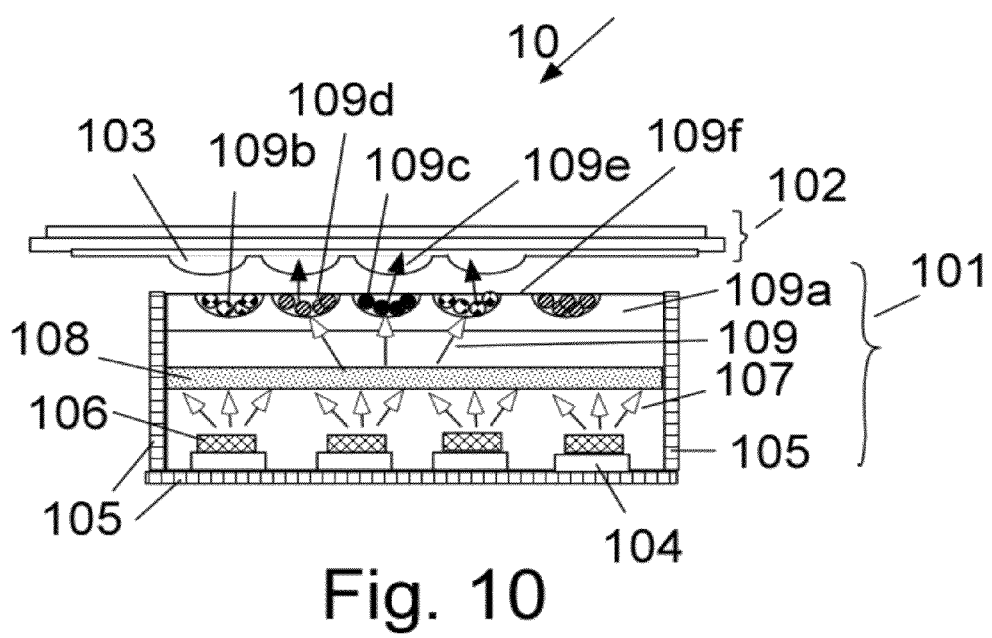
FIG. 10 shows the color pixel backlight employing quantum rods in direct-lit configuration.

Yet another embodiment of the present invention is the configuration of backlight called the 'direct-lit' backlight that is color pixelated employing quantum rods. Assembly of this backlight to the LCD that does not require color filters and polarizer is shown in a cross-sectional view 10 in FIG. 10. The assembly comprises main components namely, the pixelated backlight 101, micro-lens sheet 103 and LCD 102 that does not require color filter and polarizer. It further comprises a box coated with reflecting layers 105 on three sides, housing ultraviolet or near-ultraviolet or blue light emitting LEDs 106 with their heat sink 104, a diffuser element 108 for diffusing ultraviolet or near-ultraviolet or blue light, a rectangular plate 109*a* containing pixel cavities 109*b*, containing quantum rods that emit plane polarized red light; 109*d*, containing quantum rods that emit plane polarized blue light and 109*c*, containing quantum rods that emit plane polarized green light. LEDs are powered by application of external voltage but not shown in FIG. 10 for simplicity. The plate 109*a* is made of either borosilicate glass or quartz glass or Acrylic or plexiglass or any plastic material that has at least 90% transmission for ultraviolet and near-ultraviolet radiation and does not degrade after prolonged exposure to ultraviolet/near-ultraviolet radiation. It can be seen that ultraviolet or near-ultraviolet or blue light rays 107 emitted by the LEDs 106 are incident on the surface of the diffuser 108 and diffuse with uniformity as rays 109. These rays are incident on the quantum rods printed at the pixel sites resulting in the emission of plane polarized light of particular color 109*e*, green color in this example. Likewise, plane-polarized red color of light and plane polarized blue color of light from the pixel sites are emitted. Except for the passivation layer, also called protective layer 109*f*, over quantum rods, other layers like the black layer between the pixels and reflective layer below the black layer are not shown in FIG. 10 for simplicity. The passivation layer 109*f* is transparent to visible light without causing depolarizing effect on the visible light that passes through it. The whole light guide assembly 101, the micro-lens sheet 103, also called lenticular sheet, and the LCD 102 are kept in alignment such that different colors of light emitted by the pixels are collimated by the micro-lens sheet 103 in to the designated pixels of the LCD 102. In the micro-lens sheet every lens will be facing every pixel in complete alignment. In a specific example illustrated in FIG. 10 the plane polarized light ray, 109*e*, for example falls on the micro-lens and will get focused on to the assigned color pixel of LCD. The pixel-site in this illustration is shown as concave but it can be 'trough-like' as shown in FIG. 09. The pixel site or cavity can have a single dielectric layer or multi-dielectric layer that transmits ultraviolet or near-ultraviolet but reflects visible light, below the layer of quantum rods, as shown in later FIG. 11*b*. In this case, the LEDs employed, emit either ultraviolet light or near-ultraviolet light and not blue light. The dielectric coatings that transmit near-ultraviolet and reflect visible light are available commercially from companies like Kupo Optics. The method of deposition of black layer, reflective layer, including layer of quantum rods and patterning, was described earlier under the description for FIG. 7*a*.

Figure 11A:
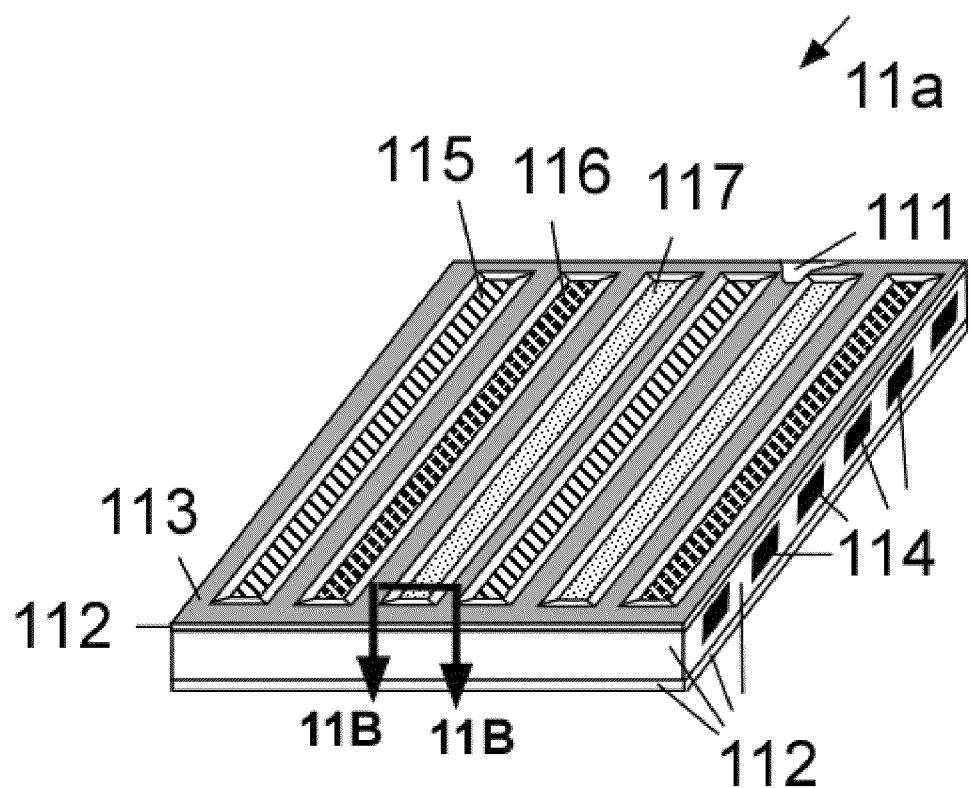
FIG. 11a shows the isometric view of edge-lit color stripe backlight employing quantum rods.

Still yet another embodiment of the present invention is the edge-lit color-striped backlight, employing quantum rods. FIG. 11*a* shows an isometric view 11*a* of such a backlight. The backlight 11*a* comprises a light guide 111, made of either borosilicate glass or quartz glass or Acrylic or plexiglass or any plastic material that has at least 90% transmission for ultraviolet and near-ultraviolet radiation and does not degrade after prolonged exposure to ultraviolet/near-ultraviolet radiation, has ultraviolet or near-ultraviolet or visible light reflectors 112 on all edges and at the top except in areas occupied by LEDs 114 and color channels 115, 116 and 117. The color channels are referred to as red light emitting channel 115, containing quantum rods that emit plane polarized red light upon excitation by ultraviolet or near-ultraviolet or blue light from LEDs, blue channel 116, containing quantum rods that emit plane polarized blue light upon excitation by ultraviolet or near-ultraviolet or blue light from LEDs and green channel 117, containing quantum rods that emit plane polarized red light upon excitation by ultraviolet or near-ultraviolet or blue light from LEDs. The sequence of these color stripes can be changed depending on brightness and resolution desired on the final LCD screen. There is a black layer 113 over the top of the reflective layer 112 and the black layer serves to enhance the contrast of LCD when the backlight is assembled at the back of the LCD. The method of deposition of these layers, including layer of quantum rod and patterning, was described earlier under the description for FIG. 7a. LEDs 114 are powered by application of external voltage which is now shown in FIG. 11a for simplicity. In the illustration, only one edge of the light guide is assembled with LEDs but they can be assembled on all four edges if need arises for increasing the light output. If this type of backlight is assembled in alignment with LCD through a micro-lens sheet, the LCD will have red, blue and green pixel in x-direction. That is, RGB in linear direction unlike quad type of color pixel format.

The cross-sectional view 11b taken along 11B-11B of FIG. 11a is shown in FIG. 11b. The light guide 118 has a trapezoidal cross-section at the pixel site. The structure comprises reflective layer 119, black layer 119a on top of reflective layer, single or multi-layer dielectric layer 119d, quantum rods 119b and a passivation layer 119c. The layers have the same property as described in foregoing paragraphs. It should be understood that with the dielectric reflective layer inside the pixel sites, blue light emitting LEDs cannot be employed as light source. However if the continuous dielectric reflective layer is replaced by a porous Al layer or reflective dielectric islands, ultraviolet or near ultraviolet or blue light emitting LEDs can be employed. The passivation layer 119c is there to protect quantum rods from moisture and other contaminants and is transparent to visible light without depolarizing effect. For the sake of simplicity, the details of shell and core of the quantum rods are omitted in FIG. 11b. For the purpose of illustration the cross-section shown is trapezoidal and in fact the cross-section can be any geometry. For the purpose of simplification in manufacturing, the striped regions can also be planar without any cavity.

Figure 12:
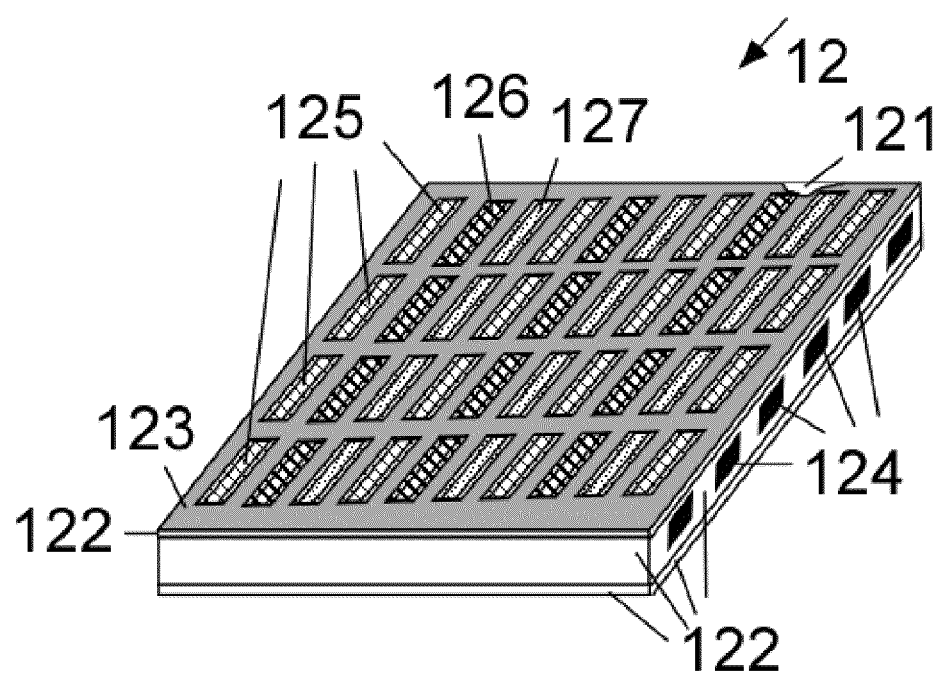
FIG. 12 shows the isometric view of edge-lit color stripe backlight in segmented configuration, employing quantum rods.

Yet another embodiment of the present invention is shown in isometric view 12 in FIG. 12. In this structure, the channels are small in length compared to the ones shown in FIG. 11a. The light guide 121 has the same optical property with regard to ultraviolet or near-ultraviolet as described in many preceding paragraphs. From top to bottom several small channels run vertically down. For example the small channels 125 contain quantum rods of the same material and size to emit red light upon excitation by the radiation originating from ultraviolet or near-ultraviolet or blue light LEDs 124 through various elements of light guide, not shown in FIG. 12. So all the channels designated as 125 are red light emitting channels. Similar small channels are designated as 126 for blue light emitting channels and 127 for green light emitting channels. The channel format is red-blue-green in the horizontal direction. This can be in a different format or color sequence in both horizontal direction and vertical direction. The reflective layers 122 and black layer 123 are deposited according to the methods described in preceding paragraphs and serve the same purpose described earlier. The cross-sectional view of the channel can be concave, trapezoidal or any convenient geometry to increase the surface area. All the elements of the cross-sectional view are as described in FIG. 11b. If required for simplicity in manufacturing, the cross-section can be just planar without any cavity or depression of the stripes. It should be understood that either ultraviolet emitting LEDs or near-ultraviolet emitting LEDs or blue light emitting LEDs or combination of these LEDs can be employed if the reflective islands of Al are deposited inside the channel or reflective islands of dielectric material is deposited inside the channel. If a continuous multi-layer dielectric layer, that transmits ultraviolet/near-ultraviolet but blocks visible light, is deposited inside the channel, only ultraviolet or near-ultraviolet emitting LEDs can be employed. The LEDs 124 are powered by application of external voltage and not shown in FIG. 12 for simplicity. In the illustration, only one edge of the light guide is assembled with LEDs but they can be assembled on all four edges if need arises for increasing the light output. This backlight, a micro-lens sheet and a LCD, without color filter and polarizer, can be kept in alignment and assembled to form a LCD module for display purposes.

Figure 13:
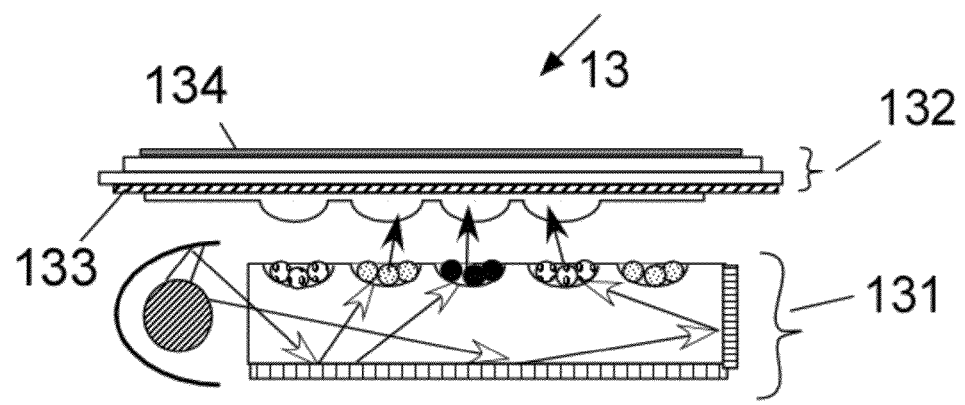
FIG. 13 shows the cross-sectional view of color pixel backlight employing quantum rods in edge-lit configuration along with the assembly of LCD, same as FIG. 8, except that FIG. 13 additionally shows a clean-up polarizer attached to LCD.

Still yet another embodiment of the present invention is to incorporate a clean-up polarizer that cleans-up any residual s-polarized light entering the LCD, if p-polarized light emitted by quantum rods contains residual s-polarized light. In this case s-polarized light is said to be impure. The clean-up polarizer does not reduce the optical efficiency of LCD but enhances the contrast of LCD. A cross-sectional view 13 of such an embodiment, illustrating the assembly of 'edge-lit' pixelated backlight to LCD, is shown in FIG. 13. The pixelated backlight 131 in edge-lit configuration is shown without details of its components since the details have been given in earlier figures. The LCD 132 has a clean-up polarizer 133 and an analyzer 134. Neither the analyzer nor the clean-up polarizer affects the optical efficiency of LCD.

Figure 14:
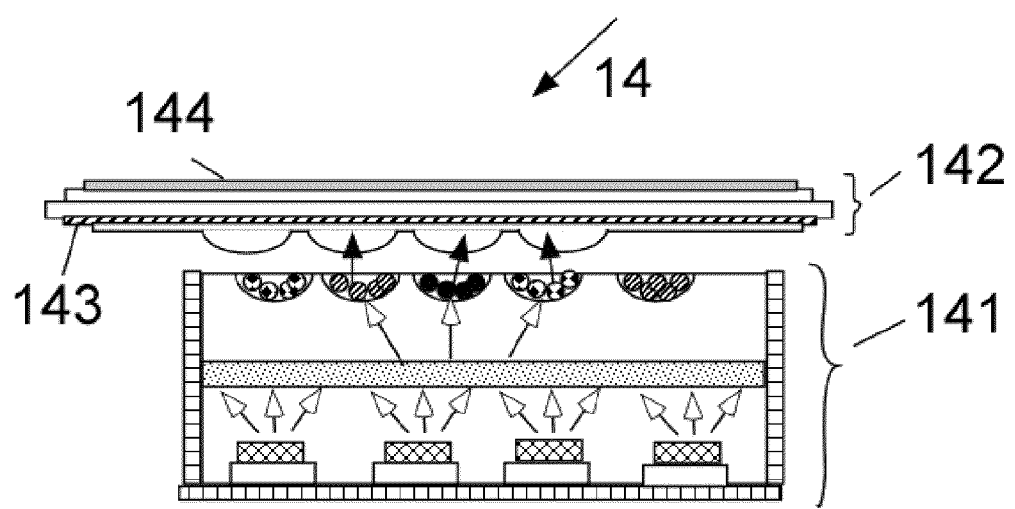
FIG. 14 shows the cross-sectional view of a color pixel backlight in direct-lit configuration along with the assembly of LCD, same as FIG. 10, except that FIG. 14 additionally shows a clean-up polarizer attached to LCD.

Still yet another embodiment of the present invention is to incorporate a clean-up polarizer that cleans-up any residual s-polarized light entering the LCD, if p-polarized light emitted by quantum rods has residual s-polarized light. In this case s-polarized light is said to be impure. The clean-up polarizer does not reduce the optical efficiency of LCD but enhances the contrast of LCD. A cross-sectional view 14 of such an embodiment, illustrating the assembly of 'direct-lit' pixelated backlight to LCD, is shown in FIG. 14. The pixelated backlight 141 in 'direct-lit' configuration is shown without details of its components since the details have been given in earlier figures. The LCD 142 has a clean-up polarizer 143 and an analyzer 144. Neither the analyzer nor the clean-up polarizer affects the optical efficiency of LCD.

It will be understood that one skilled in the art could modify the above basic design, geometries, sequence of assemblies, materials, processes and components. Various modifications and variations can be made in the construction, configuration, applications and/or operation of the present invention without departing from the scope or spirit of the invention. By way of examples, (i) the description of quantum rods in the illustrations is generally about polarized red, blue and green light emitting quantum rods but the material and size of the quantum rods can be changed to obtain narrow spectrum with desired chromaticity coordinates as well as quantum rods that emit white light can be incorporated in a white pixel along with red, blue and green pixel (ii) quantum rods with double shell can be employed (iii) the near-ultraviolet LEDs described are those whose peak wavelength is in the neighborhood of 360 nm but this can be chosen to have peak wavelength of less than 360 nm and more than 360 nm (iv) ultraviolet LEDs instead of near-ultraviolet LEDs can be employed or a combination of near-ultraviolet and ultraviolet LEDs can be employed (v) only blue light emitting LEDs can be employed (vi) the backlight box in 'direct-lit' configuration shows the ultraviolet and near-ultraviolet reflectors, ultraviolet and near-ultraviolet diffusers and heat sink but this can be modified to include many additional ultraviolet or near-ultraviolet optical elements to obtain more uniform ultraviolet or near-ultraviolet rays that can excite the quantum rods to obtain uniform colored visible light (vii) the light guide structures described are provided with basic reflectors but this can be modified to have reflector patterns and multi-layer coatings of reflectors made of metallic and dielectric films (viii) the coupling element described to couple light from quantum rods to LCD with good alignment is a sheet of micro-lens but this can be modified to include other optical elements such as prism sheet (ix) the light guide described with one edge assembled with ultraviolet or near-ultraviolet LEDs or Blue LEDs but this can be modified to have near-ultraviolet or ultraviolet or blue LEDs assembled on two edges or three edges or four edges of light guide with one edge assembled with blue light emitting LEDs and other edges with near-ultraviolet LEDs or combination of these ultraviolet or near-ultraviolet or blue light emitting LEDs (x) dielectric layer thickness and materials at the pixel sites can be modified to minimize color mixing between pixels (xi) alignment of quantum rods inside the pixel site can be improved for increasing the degree of polarized light from quantum rods.

Thus it is intended that the present invention covers the modifications and variations of the invention provided they come within the scope of the appended claims and their equivalents.

We claim:

1. A quantum rod based color-pixel backlight system, for providing increased color gamut and high optical efficiency for Liquid Crystal Display, without color filters and polarizer, comprising:
   an illuminating source of ultra-violet, near-ultraviolet light, or blue light so as to uniformly illuminate the light guide at the backside of Liquid Crystal Display;
   an array of pixel-shaped islands integral with the light guide that correspond to pixel regions of the Liquid Crystal Display, when assembled with Liquid Crystal Display, with each pixel-shaped island containing horizontally parallel-aligned quantum rods;
   a micro-lens sheet disposed between the light guide and the Liquid Crystal Display;
   said quantum rods forming red, blue, and green light emitting regions, that convert the ultra-violet or near-ultraviolet light or blue light rays incident on them into plane polarized visible light typically in red, blue and green primary colors, traveling upwards toward the said micro-lens sheet.

2. The quantum rod based color-pixel backlight system, for providing increased color gamut and high optical efficiency for Liquid Crystal Display, without color filters and polarizer, as claimed in claim 1, wherein the said light guide, with the said illuminating source, being kept in substantial alignment with the said micro-lens sheet and the said Liquid Crystal Display such that the color pixelated and plane polarized red, blue and green primary colors of light illuminates the corresponding red, blue and green pixels of the said Liquid Crystal Display.

3. The quantum rod based color-pixel backlight system for Liquid Crystal Display, without color filters and polarizer, as in claim 1 wherein said array of pixel-shaped islands contain multiplicity of reflective sub-islands, below the said aligned quantum rods, that are made of porous metallic layer.

4. The quantum rod based color-pixel backlight system for Liquid Crystal Display, without color filters and polarizer, as in claim 1 wherein the said array of pixel-shaped islands contain multiplicity of reflective sub-islands, below the said aligned quantum rods, that are made of porous single or multi-layer dielectric material that can function as small dielectric mirrors that transmit at least 80% of ultraviolet or near-ultraviolet light and reflect at least 90% of visible light.

5. The quantum rod based color-pixel backlight system for Liquid Crystal Display, without color filters and polarizer, as in claim 1 wherein the said array of pixel-shaped islands have a continuous layer of single or multi-layer dielectric material, below said aligned quantum rods, that can function as dielectric mirror that transmit at least 80% of ultraviolet or near-ultraviolet light and reflect at least 90% of visible light.

6. The quantum rod based color-pixel backlight system for Liquid Crystal Display, without color filters and polarizer, as in claim 1 wherein the said array of pixel shaped islands have concave, square, stripe, rectangular, or planar shape.

7. The quantum rod based color-pixel backlight system for Liquid Crystal Display, without color filters and polarizer, as in claim 1 wherein the said aligned quantum rods have at least one core and at least one shell around them.

8. The quantum rod based color-pixel backlight system for Liquid Crystal Display, without color filters and polarizer, as in claim 7 wherein the said core and shell materials are chosen from any of the following materials CdSe, CdTe, Silicon, InP, InAs, InGaAs, InAsP, InSb, ZnO, InS, InGaN, Si, GaN, ZnS, lanthanum based materials, or oxide based phosphor.

9. The quantum rod based color-pixel backlight system for Liquid Crystal Display, without color filters and polarizer, as in claim 7 wherein the said material of the core is doped with Boron, Manganese, Nitrogen, rare-earth materials, or combinations thereof.

10. The quantum rod based color-pixel backlight system for Liquid Crystal Display, without color filters and polarizer, as in claim 1 wherein the backlight has an edge-lit configuration with the illumination source assembled at least at one edge of the said light guide.

11. The quantum rod based color-pixel backlight system for Liquid Crystal Display, without color filters and polarizer, as in claim 1 wherein the backlight has a direct-lit configuration with the illumination source and a diffuser assembled inside a light box and the light guide with the array of pixel-shaped islands assembled above the diffuser.

12. The quantum rod based color-pixel backlight system for Liquid Crystal Display, without color filters and polarizer, as in claim 1 wherein the said quantum rods, upon excitation by ultraviolet, near-ultraviolet, or blue light, emit plane polarized light with sharp spectrum in the visible primary colors of red, blue and green.

13. The quantum rod based color-pixel backlight system for Liquid Crystal Display, without color filters and polarizer, as in claim 1 wherein the said illuminating source is a Light Emitting Diode or a plurality of Light Emitting Diodes.

* * * * *